United States Patent
Xu et al.

(10) Patent No.: US 12,089,211 B2
(45) Date of Patent: Sep. 10, 2024

(54) ELECTRONIC APPARATUS, WIRELESS COMMUNICATION METHOD AND COMPUTER-READABLE MEDIUM

(71) Applicant: Sony Group Corporation, Tokyo (JP)

(72) Inventors: Wei Xu, Jiangsu (CN); Yukuan Ji, Jiangsu (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 411 days.

(21) Appl. No.: 17/424,178

(22) PCT Filed: Feb. 7, 2020

(86) PCT No.: PCT/CN2020/074460
§ 371 (c)(1),
(2) Date: Jul. 20, 2021

(87) PCT Pub. No.: WO2020/164437
PCT Pub. Date: Aug. 20, 2020

(65) Prior Publication Data
US 2022/0078779 A1    Mar. 10, 2022

(30) Foreign Application Priority Data
Feb. 14, 2019 (CN) .......................... 201910113893.3

(51) Int. Cl.
*H04W 72/20* (2023.01)
*H02J 50/00* (2016.01)
(Continued)

(52) U.S. Cl.
CPC ........... *H04W 72/20* (2023.01); *H02J 50/001* (2020.01); *H02J 50/80* (2016.02); *H04W 72/0446* (2013.01)

(58) Field of Classification Search
CPC . H04W 72/0446; H04W 72/27; H04W 72/23; H02J 50/001; H02J 50/80; H02J 50/20; H04L 5/0053
See application file for complete search history.

(56) References Cited

U.S. PATENT DOCUMENTS

2010/0265874 A1    10/2010  Palanki
2012/0163263 A1     6/2012  Oh et al.
(Continued)

FOREIGN PATENT DOCUMENTS

CN    104601297 A    5/2015
CN    104854773 A    8/2015
(Continued)

OTHER PUBLICATIONS

International Search Report and Written Opinion mailed on Apr. 24, 2020, received for PCT Application PCT/CN2020/074460, Filed on Feb. 7, 2020, 9 pages including English Translation.

*Primary Examiner* — Peter P Chau
(74) *Attorney, Agent, or Firm* — XSENSUS LLP

(57) ABSTRACT

The present disclosure relates to an electronic apparatus, a wireless communication method and a computer-readable medium. The electronic apparatus for wireless communication comprises a processing circuit. The processing circuit is configured to carry out control so as to receive information related to resources used by a user equipment to carry out energy harvesting. The processing circuit is further configured to control, based on the information, the user equipment to receive wireless signals from one or more base stations and to convert the wireless signals into electromagnetic wave energy for energy harvesting.

15 Claims, 18 Drawing Sheets

(51) Int. Cl.
    *H02J 50/80*         (2016.01)
    *H04W 72/0446*    (2023.01)

(56) References Cited

U.S. PATENT DOCUMENTS

| | | |
|---|---|---|
| 2012/0214536 A1 | 8/2012 | Kim |
| 2014/0036877 A1 | 2/2014 | Campbell et al. |
| 2015/0043683 A1* | 2/2015 | Kato ................... H04L 5/0048 |
| | | 375/340 |
| 2015/0303741 A1 | 10/2015 | Malik et al. |
| 2017/0086144 A1* | 3/2017 | Hunukumbure .. H04W 52/0206 |
| 2017/0208568 A1 | 7/2017 | Nam |
| 2017/0257728 A1* | 9/2017 | Lee ....................... H04W 72/04 |
| 2018/0109150 A1 | 4/2018 | Khan et al. |
| 2019/0044392 A1* | 2/2019 | Chowdhury ............ H02J 7/007 |
| 2019/0261291 A1* | 8/2019 | Liu ....................... H04L 5/0051 |
| 2020/0106292 A1* | 4/2020 | Lee ....................... H02J 7/0071 |
| 2020/0205158 A1* | 6/2020 | Lee ................... H04W 72/0473 |

FOREIGN PATENT DOCUMENTS

| | | |
|---|---|---|
| CN | 106231665 A | 12/2016 |
| CN | 106233559 A | 12/2016 |
| CN | 107835499 A | 3/2018 |
| CN | 107995631 A | 5/2018 |
| CN | 108900444 A | 11/2018 |
| CN | 109219151 A | 1/2019 |
| CN | 109257812 A | 1/2019 |
| JP | 2003047177 A | 2/2003 |
| WO | WO-2019026216 A1 | 2/2019 |

* cited by examiner

ELECTRONIC APPARATUS, WIRELESS COMMUNICATION METHOD AND COMPUTER-READABLE MEDIUM

CROSS-REFERENCE TO RELATED APPLICATIONS

The present application is based on PCT filing PCT/CN2020/074460, filed Feb. 7, 2020, which claims priority to Chinese Patent Application No. 201910113893.3, titled "ELECTRONIC APPARATUS, WIRELESS COMMUNICATION METHOD AND COMPUTER-READABLE MEDIUM", filed on Feb. 14, 2019 with the China National Intellectual Property Administration (CNIPA), the contents of each are incorporated herein by reference in its entirety.

FIELD

The present disclosure generally relates to the field of wireless communication, and in particular to an electronic device for wireless communication, a wireless communication method, and a computer readable medium.

BACKGROUND

Energy harvesting can be applied to wireless communication systems. In the energy harvesting process, the user equipment can obtain energy from an external source such as a base station via wireless transmission and convert the obtained energy into electrical energy.

SUMMARY

In the following, an overview of the embodiments of the present disclosure is given simply to provide basic understanding to some aspects of the present disclosure. It should be understood that, the summary is not an exhaustive summary of the present disclosure. It is neither intended to determine a critical part or an important part of the present disclosure, nor to limit the scope of the present disclosure. The purpose is only to provide some concepts in a simplified form, as a preamble of a detailed description later.

According to an embodiment, an electronic device for wireless communication is provided. The electronic device includes processing circuitry. The processing circuitry is configured to perform control to receive information on a resource for user equipment to perform energy harvesting. The processing circuitry is further configured to control, based on the information, the user equipment to receive a wireless signal from one or more base stations, and to convert the wireless signal into electromagnetic wave energy to perform energy harvesting.

According to another embodiment, a wireless communication method includes a step of receiving information on a resource for user equipment to perform energy harvesting. The method further includes a step of controlling, based on the information, the user equipment to receive a wireless signal from one or more base stations, and to convert the wireless signal into electromagnetic wave energy to perform energy harvesting.

According to an embodiment, an electronic device for wireless communication is provided. The electronic device includes processing circuitry. The processing circuitry is configured to perform control to transmit, by a first base station, information on a resource for user equipment to perform energy harvesting to the user equipment or a second base station. The processing circuitry is further configured to perform control to transmit a wireless signal for energy harvesting to the user equipment.

According to another embodiment, a wireless communication method includes a step of controlling a first base station to transmit information on a resource for user equipment to perform energy harvesting to the user equipment or a second base station. The method further includes a step of transmitting a wireless signal for energy harvesting to the user equipment.

According to another embodiment, a computer-readable medium including executable instructions is provided. When executed by an information processing device, the executable instructions cause the information processing device to implement the above method.

With the embodiments of the present disclosure, the user equipment can effectively perform energy harvesting from the wireless signal from the base station.

BRIEF DESCRIPTION OF THE DRAWINGS

The present disclosure may be understood better with reference to the description given in conjunction with drawings hereinafter. The same or similar reference numerals are used to indicate the same or similar components throughout the drawings. The drawings together with the following detailed description are included in the specification and form a part of the specification, so as to illustrate preferred embodiments of the present disclosure by examples and explain principles and advantages of the present disclosure. In the drawings.

DETAILED DESCRIPTION

Figure 1:
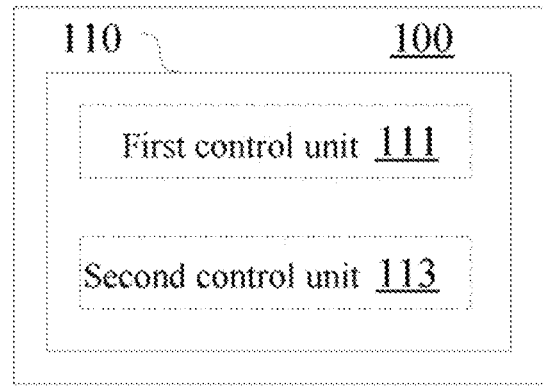
FIG. 1 is a block diagram showing a configuration example of an electronic device for wireless communication according to an embodiment of the present disclosure.

Embodiments of the present disclosure are described below with reference to the drawings. Elements and features described in one of the drawings or one of the embodiments of the present disclosure may be combined with elements and features described in one or more other drawings or embodiments. It should be noted that representations and descriptions of components and processing which are irrelevant to the present disclosure or known by those skilled in the art are omitted in the drawings and the description for clarity.

An exemplary configuration of an electronic device for wireless communication according to an embodiment of the present disclosure is described below with reference to FIG. 1. As shown in FIG. 1, an electronic device 100 for wireless communication according to the embodiment includes processing circuitry 110. The processing circuitry 110 may be implemented as, for example, a chip, a chipset, a central processing unit (CPU), or the like.

The electronic device according to the embodiment may be implemented on a user equipment (UE) side.

As shown in FIG. 1, the processing circuitry 110 includes a first control unit 111 and a second control unit 113. It should be noted that, although the first control unit 111 and the second control unit 113 are shown in a form of functional blocks in the drawings, it should be understood that functions of these units may also be implemented by the processing circuitry as a whole, and are unnecessarily implemented by discrete actual components in the processing circuitry. In addition, although the processing circuitry is shown as one block in the drawings, the electronic device may include multiple processing circuitry. The functions of these units may be distributed to the multiple processing circuitry, so that the multiple processing circuitry cooperate to perform these functions.

The first control unit 111 is configured to perform control to receive information on a resource for user equipment to perform energy harvesting.

The second control unit 113 is configured to control, based on the received information, the user equipment to receive a wireless signal from one or more base stations, and to convert the wireless signal into electromagnetic wave energy to perform energy harvesting.

According to an embodiment, the information on the resource for energy harvesting may include indication information on a frame structure of the wireless signal. The indication information may include, for example, a Slot Format Indication (SFI), which is a bit sequence used to indicate the time slot format.

In the following embodiments, the indication information on the frame structure is taken as an example for description. However, it should be pointed out that the information on the resources for energy harvesting is not limited to the indication information on the frame structure, but may include any indication information that indicates the time-frequency resource used for energy harvesting, as long as the UE can determine the time-frequency resource for energy harvesting according to the information.

The indicated frame structure may include symbols for energy harvesting, and the second control unit 113 may be configured to control the user equipment to harvest energy on at least the symbols for energy harvesting. In addition, the indicated frame structure may include downlink symbols for data transmission, and the second control unit 113 may be configured to control the user equipment to receive data or harvest energy on the downlink symbols for data transmission.

In other words, UEs can be classified into data transmission (DT) users, energy harvesting (EH) users, and data transmission and energy harvesting (DT-EH) users according to functions and/or operating modes. The DT user is a UE working in the data transmission mode, and it only transmits data during the considered time. The EH user is a user working in the energy harvesting mode, and it only harvests energy during the time under consideration. The DT-EH user is a UE working in the data transmission and energy harvesting mode, and it can both transmit data and harvest energy within the time under consideration.

Correspondingly, there may be symbols for data transmission (which hereinafter may be referred to as DT symbols) and symbols for energy harvesting (which hereinafter may be referred to as EH symbols) in the frame structure of the wireless signal. In terms of energy harvesting, EH users can use EH symbols, or multiplex all downlink symbols to harvest energy: DT-EH users can transmit data on the allocated downlink symbols, and can harvest energy on all downlink symbols.

In addition, the frame structure may be selected for example by the base station from a plurality of frame structures, each of which may be defined based on a predetermined rule. Generally speaking, the defined frame structure needs to be such that energy harvesting does not occupy a resource for data transmission, does not affect data transmission, and does not interfere with uplink and downlink switching.

More specifically, the predetermined rule may include, for example, that symbols used for energy harvesting do not occupy resources for data transmission, thereby preventing energy harvesting from affecting data transmission.

The predetermined rule may also include that a downlink symbol immediately preceding a symbol for energy harvesting is not used for downlink data transmission. This rule takes into account that, for example, a DT-EH user needs to transmit data and harvest energy within the time under consideration. Therefore, there may be not enough time to switch between an EH mode and a DT mode between two adjacent symbols. However, the downlink symbol immediately preceding the EH symbol can still be allocated to a DT user for data transmission.

The predetermined rule may also include that a symbol immediately preceding an uplink symbol or a part thereof is not used for energy harvesting, so as to avoid affecting the uplink and downlink switching.

Figure 13:
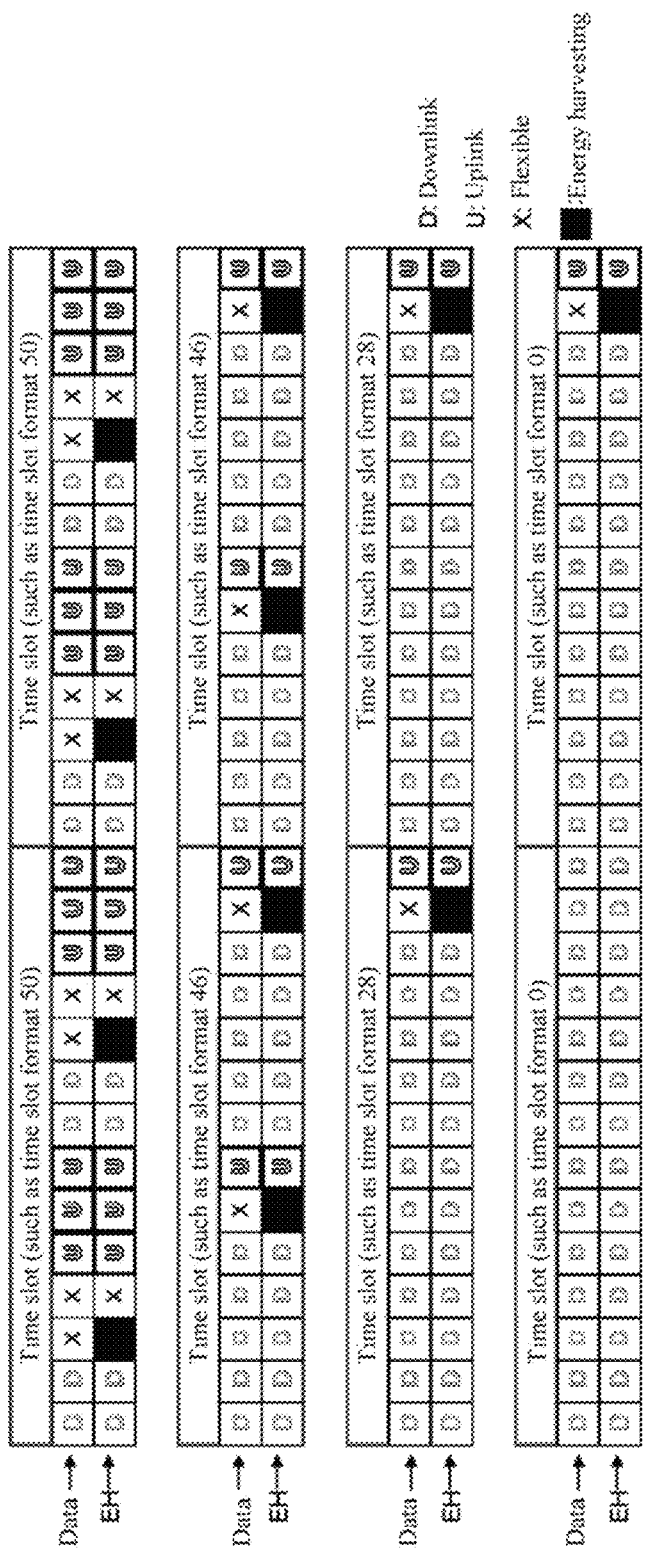
FIG. 13 is a schematic diagram showing an example frame structure.
Figure 14A:
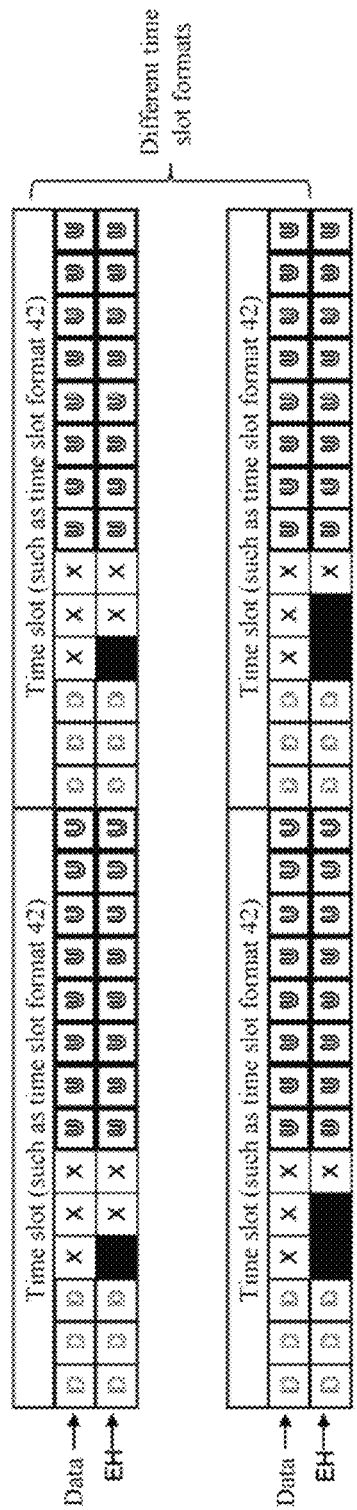
FIGS. 14A and 14B are schematic diagrams showing example frame structures for energy harvesting.
Figure 14B:
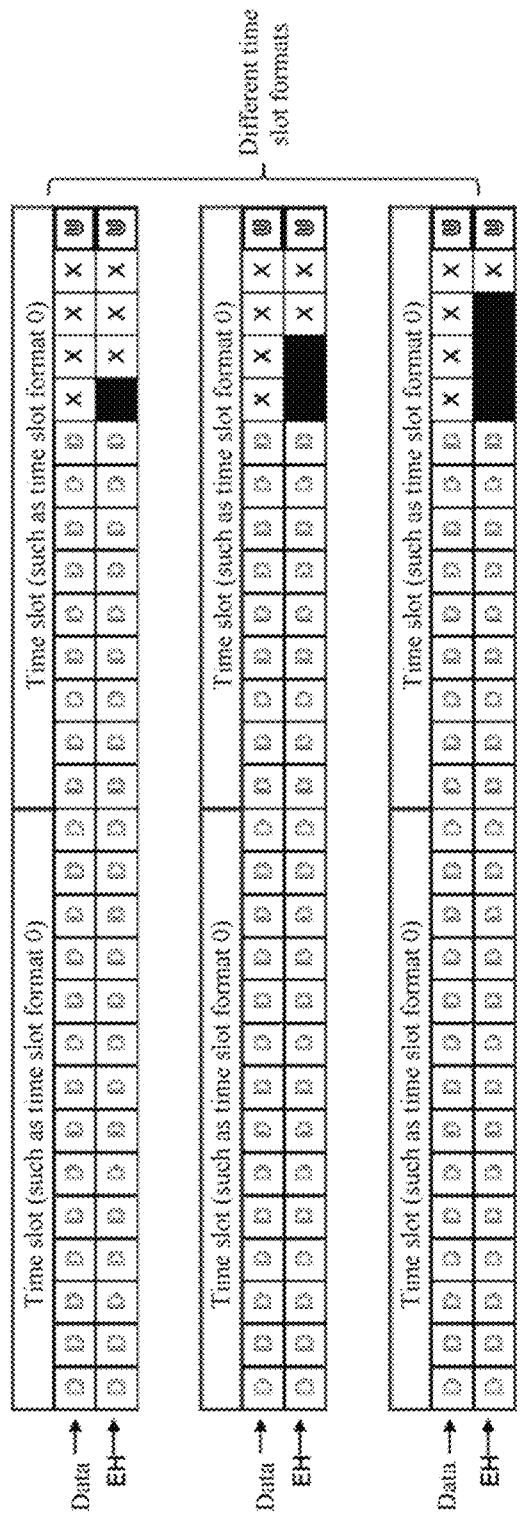
Figure 15:
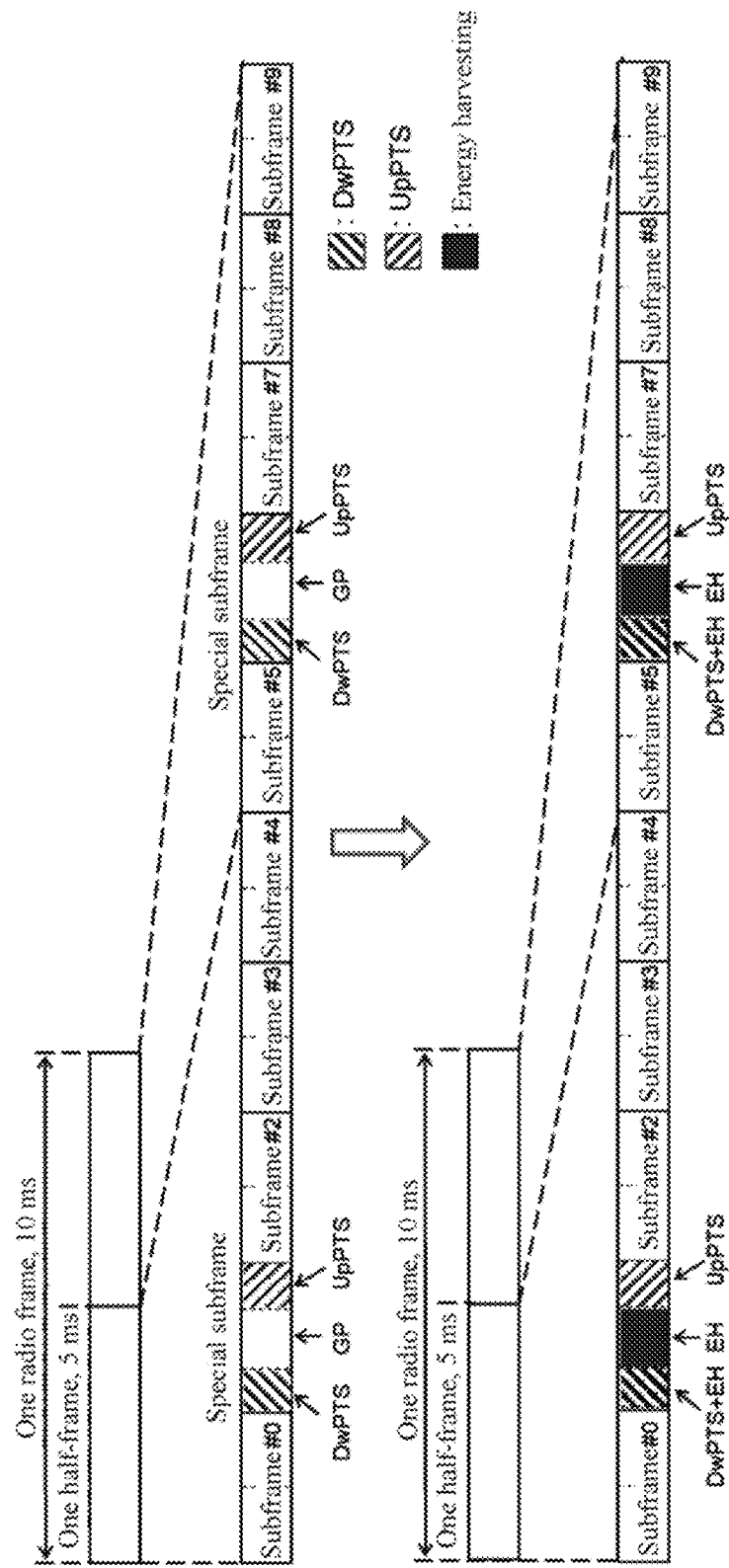
FIG. 15 is a schematic diagram for explaining an example frame structure.

Next, with reference to FIGS. 13 to 15, examples of frame structures that can be used for energy harvesting are described, including frame structures that are defined on the basis of the frame structures of 5G NR (New Radio) and LTE-A (Advanced Long Term Evolution) respectively and include data transmission symbols/subframes and energy transmission symbols/subframes.

FIG. 13 and FIGS. 14A and 14B show exemplary NR frame structures and examples of corresponding frame structures that can be used for energy harvesting.

FIG. 13 shows time slot format 50, time slot format 46, time slot format 28, and time slot format 0 (indicated by "data" in the figure) and the corresponding frame structures defined for energy harvesting (indicated by "EH" in the figure). In the frame structure used for data transmission, the variable symbol indicated by "X" can be used as both an uplink transmission symbol and a downlink transmission symbol. In the EH frame structure, the variable symbol can be used to transmit energy.

In the example shown in FIG. 13, according to the rule that the symbol immediately preceding the uplink symbol or its part is not used for energy harvesting, in the EH frame structure corresponding to time slot format 50, in two continuous flexible symbols, the former one is used for energy harvesting. In the EH frame structure corresponding to time slot formats 46, 28, or 0, since there is only one continuous flexible symbol, the flexible symbol can be used as an energy harvesting symbol, and the end of the energy harvesting symbol can be set as not available for energy harvesting. In addition, in the EH frame structure corresponding to time slot format 50, two continuous flexible symbols can be used for energy harvesting. In this case, the end part of the latter of the two continuous flexible symbols can be set as not available for energy harvesting.

According to the above rules, if a slot contains only one variable symbol, then this symbol can be used as an EH symbol. If the EH symbol is followed by an uplink symbol, the end part of the EH symbol can be set as not available for energy harvesting.

In addition, if there are continuous variable symbols in a time slot, the first few variable symbols are preferentially selected as EH symbols, and the remaining variable symbols can still be used as uplink or downlink symbols, as shown in FIG. 14A and FIG. 14B. Among the defined time slot formats, time slot formats with different numbers of EH symbols can be regarded as different time slot formats.

FIG. 15 shows the frame structure of LTE-A and an example of the corresponding EH frame structure. In FIG. 15, part of the symbols in the special subframe are multiplexed to transmit energy for EH users. The special subframes in the cellular network are designed to meet the requirements of synchronization accuracy. The special subframes are composed of a downlink pilot time slot (DwPTS), a guard interval (GP), and an uplink pilot time slot (UpPTS). It can be assumed that the EH network does not have high requirements for synchronization accuracy, so DwPTS and GP can be multiplexed to transmit energy for EH users.

It should be pointed out that the above examples are only illustrative and not restrictive.

According to an embodiment, the frame structure may be selected by the base station from a plurality of predefined frame structures, and these frame structures may include frame structures used by one or more other base stations that are to cooperate with the base station to transmit energy to the user equipment structure.

In addition, a plurality of base stations that cooperate to transmit energy to the user equipment may be determined according to the position (location) of the user equipment.

In the traditional data transmission network, the user access strategy considers the user load of the cell, and increases the access SINR (signal to interference and noise ratio) bias for the heavily loaded cell. Based on this access strategy, when the cell where the user is located is under a heavy load, the user may access a cell that is far away but lightly loaded. If this kind of access strategy is adopted, EH users may access to gNBs that are farther away, resulting in lower energy harvesting efficiency for EH users. The position of the user equipment is used to determine the cooperative base station that transmits energy to the user equipment, which helps to improve the efficiency of energy transmission.

Next, an example method of determining a cooperative base station is explained first, and then an example method of selecting a frame format from the frame formats of the cooperative base station(s) is further explained.

In the following description, the primary serving cell refers to the cell that the user accesses, the primary serving gNB refers to the base station in the primary serving cell, and the secondary cell/gNB refers to the neighboring cells/base station that form a cooperative set with the primary serving cell/gNB.

If the DT primary serving gNB is the base station closest to the EH user, there is no need to switch the primary serving base station; otherwise, the primary serving base station switching process can be performed. In the case that the DT primary serving gNB is not the base station closest to the EH user, the DT primary serving gNB can help the UE identify the EH primary serving gNB. In addition, the EH primary serving gNB can identify the secondary gNB according to the neighbor cell ID reported by the user, for example. The secondary gNB and the primary serving gNB together form a cooperative set.

More specifically, after the energy harvesting process is started, the switching process of the primary serving gNB can be performed as needed, that is, switching from the DT primary serving gNB to the EH primary serving gNB.

For example, the DT primary serving gNB can help the EH user identify the EH primary serving gNB in the following manner.

The DT primary serving gNB can directly coordinate with neighboring gNBs to confirm the gNB closest to the EH user as the EH primary serving gNB and notify the same to the user. Alternatively, the DT primary serving gNB may transmit the EH primary serving cell ID to the EH user, and then the EH user may transmit an access request to the EH primary serving gNB, and access the EH primary serving gNB after confirmation.

Next, the EH primary serving gNB can identify the secondary EH gNB according to the neighbor cell ID reported by the user. These secondary gNBs and the EH primary serving gNB together form a cooperative set and jointly transmit energy for the EH user.

The following describes an example manner of selecting a frame format from the frame formats of cooperative base stations.

In the case that the cooperative set is determined, according to the frame structure currently adopted by the secondary gNB, the EH primary serving gNB can re-select a suitable frame structure for the cooperative set, and configure the network under the selected frame structure.

Figure 16:
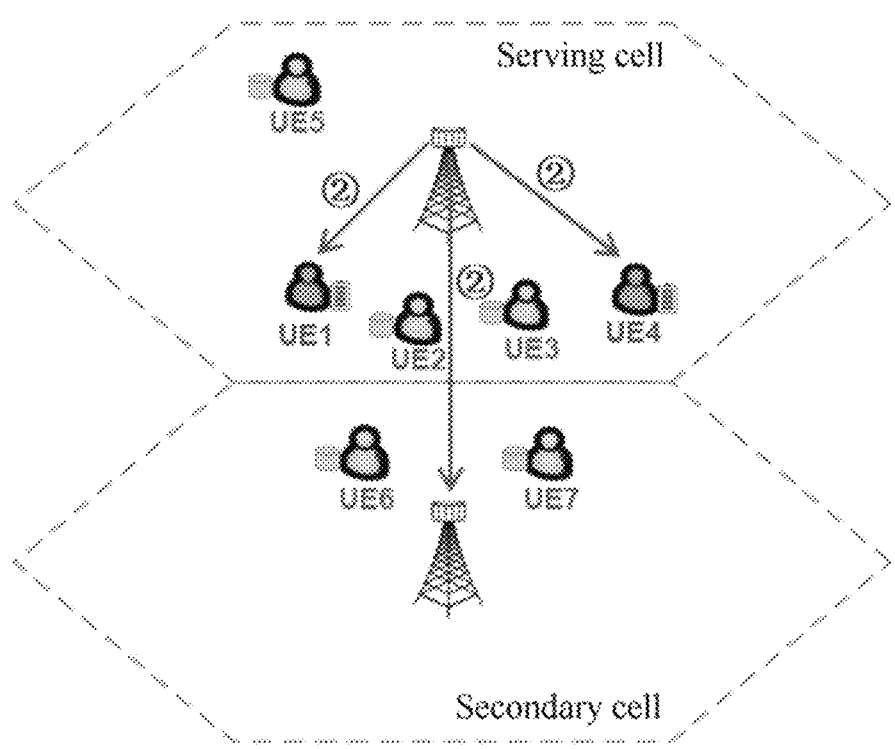
FIG. 16 is a schematic diagram for explaining an example situation in which a serving cell transmits handshake information.

More specifically, each secondary gNB in the cooperation set may report its current SFI to the EH primary serving gNB, for example. In order to transmit energy to EH users, the primary EH serving gNB re-selects an appropriate frame structure for the cooperative set. According to the currently adopted frame structure, the selection of the new frame structure should change the frame structure of the secondary gNB as little as possible. Then, the EH primary serving gNB can notify the EH user and the secondary gNB of the SFI corresponding to the selected frame structure through handshake information, as shown in (2) in FIG. 16. Subsequently, each gNB can switch its frame structure to the indicated frame structure respectively.

Figure 17:
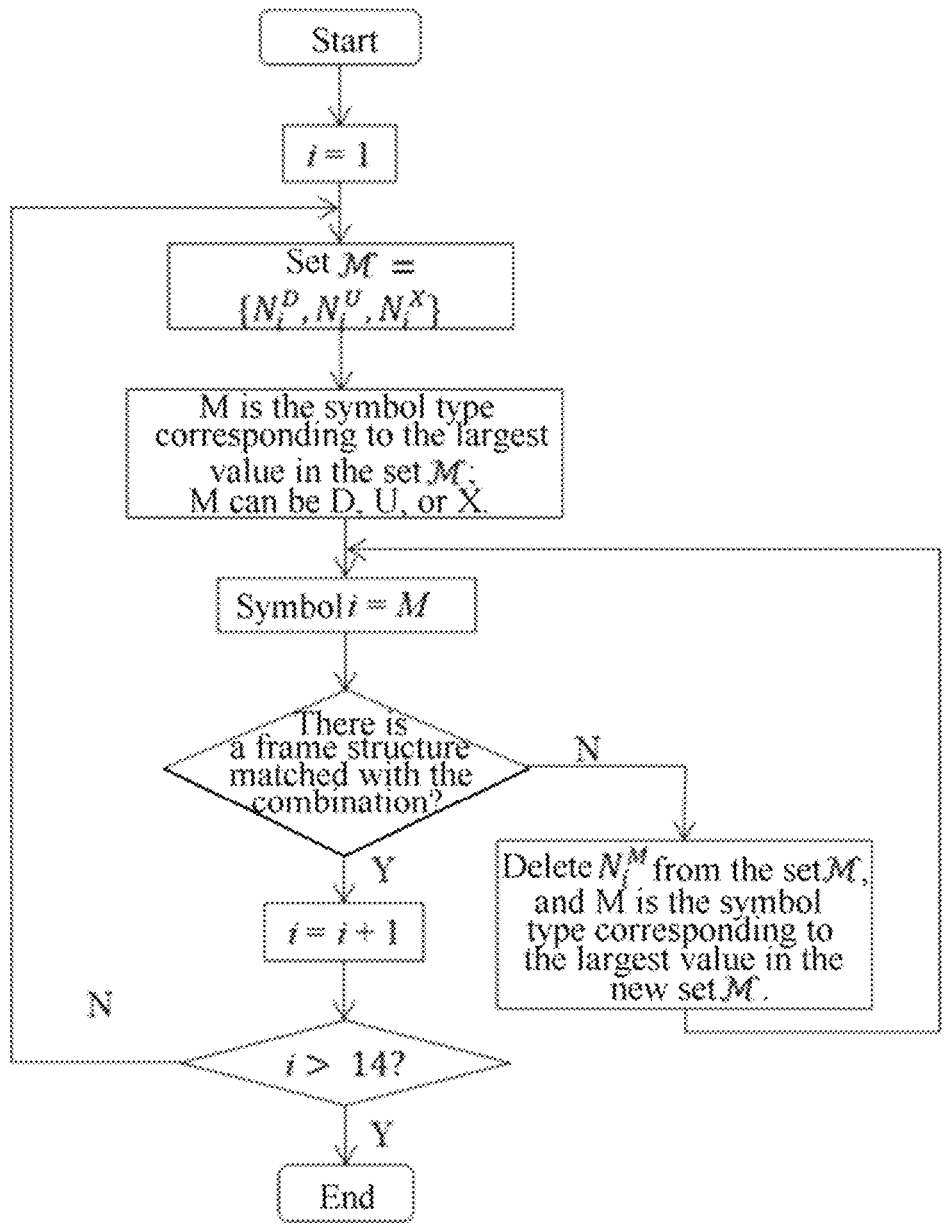
FIG. 17 is a flowchart for explaining a process example of frame structure selection.

Next, an example manner of selecting a frame structure will be described with reference to FIG. 17.

Suppose that there are N gNBs in the cooperative set, and the frame structure currently adopted by each $gNB_n$ is $SF1_n$. Each symbol i in the selected frame structure is determined by the corresponding bits of $SFI_1$ to $SFI_N$. NP Represents the number of "D" in the i-th positions in $SFI_1$ to $SFI_N$. Similarly, $N_i^U$ and $N_i^X$ respectively indicate the numbers of "U" and "X" in the corresponding bits. The symbol i is firstly determined by the largest value of $N_i^D$, $N_i^U$ and $N_i^X$. If NP is the largest, the symbol i is "D"; if $N_i^U$ is the largest, the symbol i is "U"; if $N_i^X$ is the largest, the symbol i is "X". After each symbol is determined, the symbol forms a combination with all the previously determined symbols, and the combination is compared with the designed frame structures. If there is no frame structure matched with the combination, then the symbol is re-selected. After all symbols are selected according to this criterion, the frame structure is determined.

If the selected frame structure does not contain EH symbols, the EH primary serving gNB can delete the gNB farthest from the user from the cooperative set and reselect a frame structure until the selected frame structure contains at least one EH symbol.

After the EH primary serving gNB completes the selection of the frame structure, each gNB in the cooperative set can switch to the newly selected frame structure and allocate network resources to users within their respective coverage areas.

More specifically, for each gNB in the cooperative set, uplink symbols can be allocated to DT users, downlink symbols can be allocated to DT users and DT-EH users, EH symbols can be allocated to EH users and DT-EH users, and variable symbols can be allocated to DT users and DT-EH users. In particular, a downlink symbol that is before the EH symbol and immediately adjacent to the EH symbol is not allocated to DT-EH users, so as to avoid a situation where there is no enough time to switch from a DT mode to an EH mode.

In addition, to make fuller use of resources, in addition to the allocated EH symbols, each EH user can also reuse all downlink symbols to harvest energy.

DT-EH users can transmit data on the downlink symbols allocated to them, and can harvest energy on all downlink symbols, regardless of whether these downlink symbols are allocated to them. Specifically, DT-EH users need to both transmit data and harvest energy within the time under consideration, so the base station can allocate downlink symbols and EH symbols to these DT-EH users. On the EH symbols allocated to these users, the base station transmits energy specifically for these users, and the beam is aimed at the users, and the energy harvesting efficiency is high. On the downlink symbols that are not allocated to these users, the base station may transmit radio frequency signals to other users. Although the signals are not transmitted to the DT-EH users at this time, the DT-EH users may also receive these radio frequency signals and harvest the energy of the signals.

In the following, referring to an example of resource allocation shown in FIG. 18, an example manner in which EH users and DT-EH users multiplex downlink symbols to harvest energy will be described.

Figure 18:
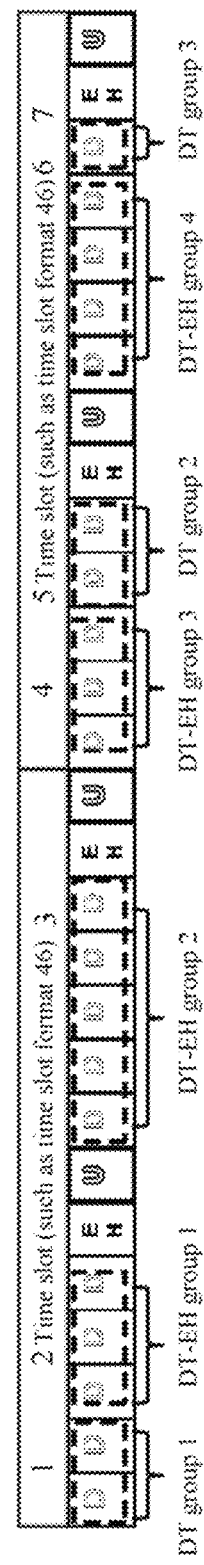
FIG. 18 is a schematic diagram for explaining an example of resource allocation.

In FIG. 18, the downlink symbols are divided into seven groups, i.e. groups 1-7, and each group of downlink symbols is allocated to a group of users. For example, DT-EH user group 1 transmits data on symbol group 2, while DT-EH user groups 2, 3, and 4 can harvest energy on symbol group 2. Similarly, DT-EH user group 1 can also harvest energy on symbol groups 3, 4, and 6. In addition, although not shown in FIG. 18, EH users can harvest energy not only on the EH symbols allocated to them, but also on all downlink symbols.

It should be pointed out that the DT user, DT-EH user, and EH user mentioned in the above example can respectively refer to the UE working in the DT mode, the UE working in the DT-EH mode, and the UE working in the EH mode. In other words, the same UE can work as a DT user, DT-EH user or EH user at different times.

As mentioned earlier, the UE can switch to an energy harvesting mode under certain conditions. Next, an embodiment related to the triggering of energy harvesting will be explained.

Figure 2:
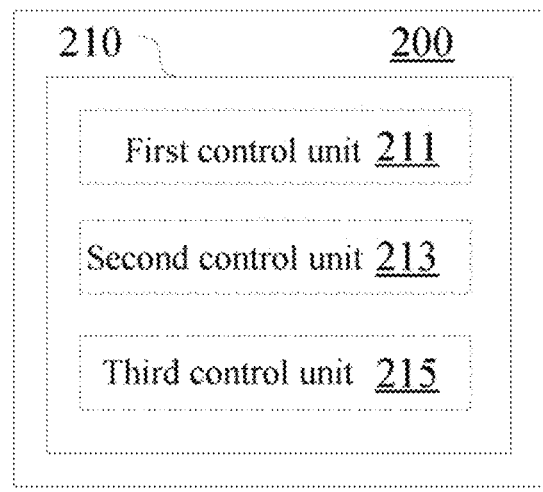
FIG. 2 is a block diagram showing a configuration example of an electronic device for wireless communication according to another embodiment of the present disclosure.

As shown in FIG. 2, the electronic device 200 for wireless communication according to an embodiment includes a processing circuitry 210. The processing circuitry 210 includes a first control unit 211, a second control unit 213, and a third control unit 215. The configurations of the first control unit 211 and the second control unit 213 are similar to those of the first control unit 111 and the second control unit 113 described earlier with reference to FIG. 1.

The third control unit 215 is configured to perform an operation for triggering of energy harvesting.

The triggering of energy harvesting can be actively performed by the UE. For example, the operation may include making a request to the base station for switching to the energy harvesting mode when it is detected that a remaining power of the user equipment is lower than a predetermined threshold.

On the other hand, the triggering of energy harvesting can also be performed by the base station. For example, the operation may include receiving an instruction from the base station to switch the user equipment to the energy harvesting mode. The instruction may be determined by the base station according to the status information reported by the UE.

Correspondingly, the operation for triggering of energy harvesting on the UE side may also include reporting the energy status, the priority of energy harvesting, the neighbor cell identification, and/or the user equipment type and the battery type of the user equipment to the base station.

Specifically, the user equipment can detect its own remaining power in real time, for example. During the communication with the DT primary serving gNB, the user can report basic information to it, including the energy status of the device terminal, the priority of the EH user, the neighbor cell ID, the device type, and the battery type.

Based on the information reported by the user, the DT primary serving gNB or user equipment can trigger the energy harvesting process to facilitate the timely transmission of energy to a user with low power.

Figure 12:
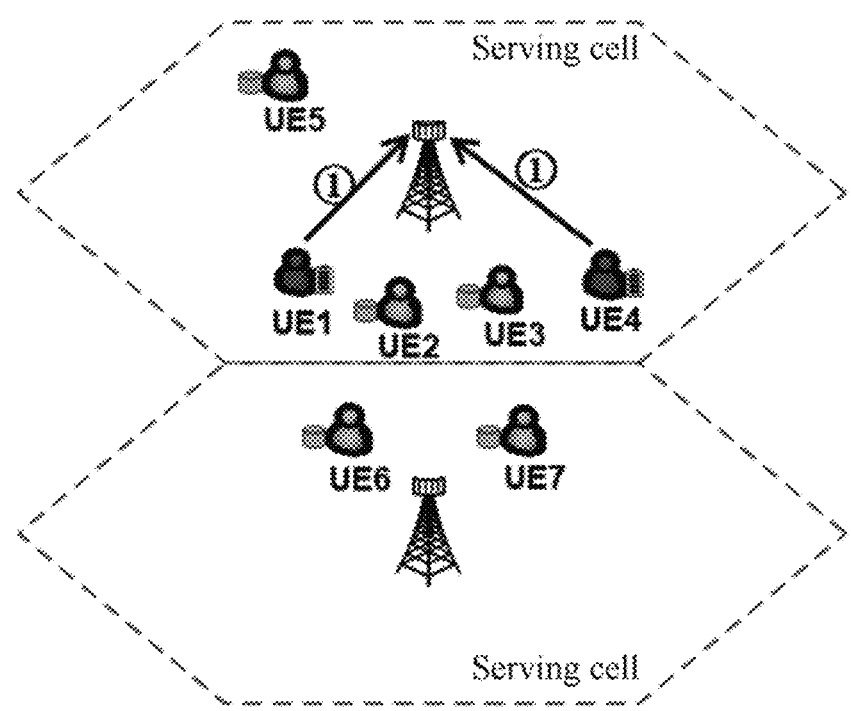
FIG. 12 is a schematic diagram for explaining an example situation in which a user equipment transmits an energy harvesting request.

Regarding the manner that the user equipment triggers the energy harvesting process, as shown in FIG. 12, once the user equipment detects that its remaining power is lower than a certain threshold, it can actively report the EH request to the primary serving gNB and request to switch to the EH mode, and it can also periodically report power update information.

Regarding the manner that the gNB triggers the energy harvesting process, according to the information reported by the users, once the gNB finds that the users are in a low battery state, it can actively perform the EH process, allocate resources and transmit energy to these users.

In addition, as mentioned earlier, when the UE needs to switch from the DT primary serving gNB to the EH primary serving gNB, it can receive the identification of the primary serving base station in the energy harvesting mode from the primary serving base station in the data transmission mode, and request to access the primary serving base station in the energy harvesting mode.

According to one aspect of the present invention, an energy harvesting dedicated pilot (reference signal) (that may be referred to as EH-RS hereinafter) can be designed for users who need to harvest energy. Next, an embodiment of this aspect will be described with reference to FIG. 2 as well.

As shown in FIG. 2, the electronic device 200 for wireless communication according to an embodiment includes a processing circuitry 210. The processing circuitry 210 includes a first control unit 211, a second control unit 213, and a third control unit 215. The configurations of the first control unit 211 and the second control unit 213 are similar to those of the first control unit 111 and the second control unit 113 described earlier with reference to FIG. 1.

The third control unit 215 is configured to perform control to transmit a pilot for energy harvesting.

Preferably, the pilot can occupy resources spaced apart in both the time domain and the frequency domain, and it does not occupy the time-frequency resources of a demodulation reference signal (DMRS, which is used for correlated demodulation) or a sounding reference signal (SRS, which is used for detecting uplink channel quality).

In other words, a dedicated pilot signal EH-RS that is set for energy harvesting can be designed for the EH network.

In addition, unlike existing data transmission networks, orthogonal pilot sequences are unnecessary in energy harvesting networks. Therefore, EH users can share the same EH-RS.

FIGS. 19A to 19D show examples of EH-RS configurations.

Figure 19A:
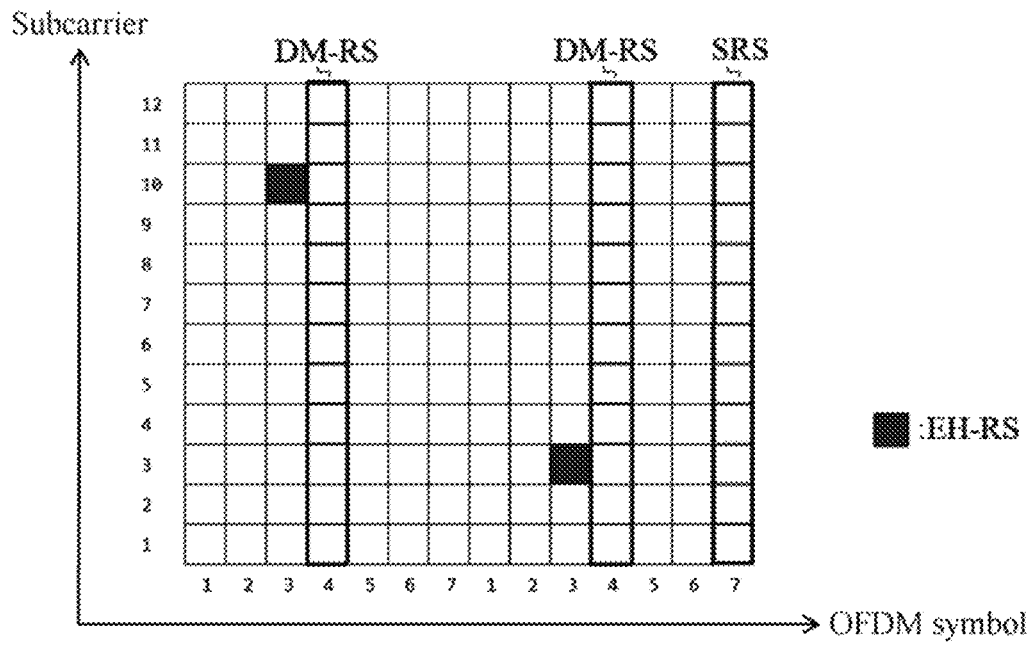
FIGS. 19A to 19D are schematic diagrams showing examples of pilot configurations for energy harvesting.
Figure 19B:
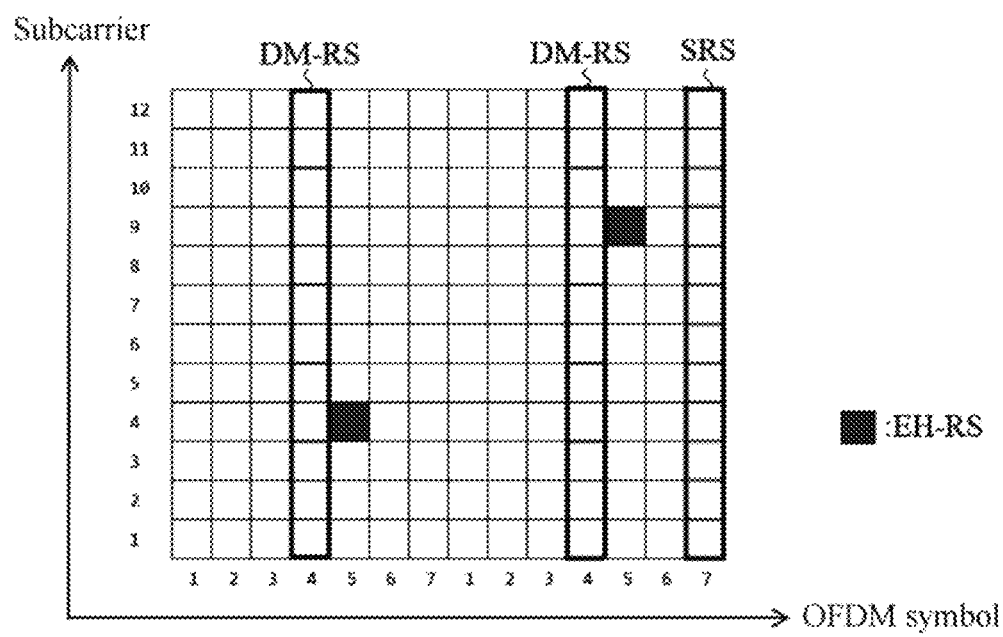
Figure 19C:
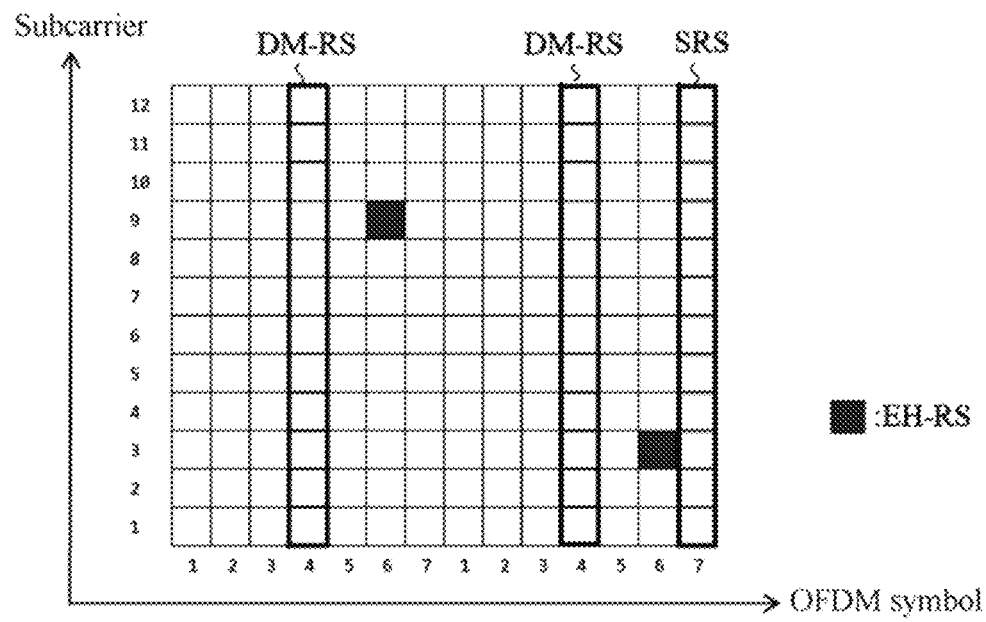
Figure 19D:
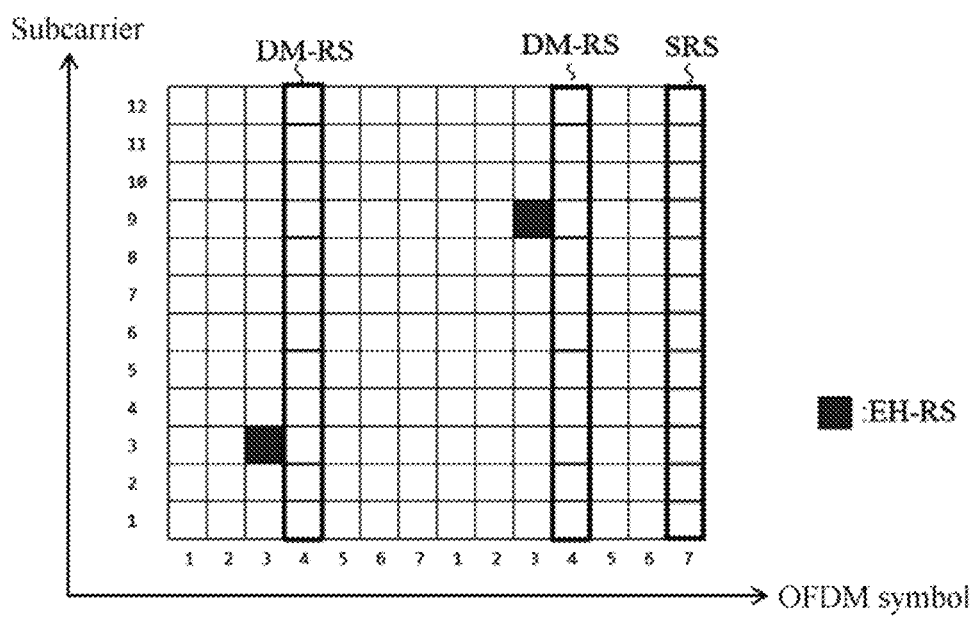

In the example shown in FIG. 19A, the 3rd symbol on the 10th subcarrier and the 10th symbol on the 3rd subcarrier are selected for EH-RS. In the example shown in FIG. 19B, the 5th symbol on the 4th subcarrier and the 12th symbol on the 9th subcarrier are selected for EH-RS. In the example shown in FIG. 19C, the 6th symbol on the 9th subcarrier and the 13th symbol on the 3rd subcarrier are selected for EH-RS. In the example shown in FIG. 19D, the 3rd symbol on the 3rd subcarrier and the 10th symbol on the 9th subcarrier are selected for EH-RS. It can be seen that the two symbols used to design the EH-RS are discrete in both the time domain and the frequency domain, so accurate channel estimation can be obtained through the EH-RS.

However, the EH-RS configuration according to the present embodiment is not limited to the above example, but may adopt any combination of resources that are spaced apart in both the time domain and the frequency domain and do not occupy the time-frequency resources of the DMRS and SRS.

In addition, in the case of performing energy harvesting from the cooperative base station, the EH user can transmit the EH-RS to the primary serving gNB and the secondary gNB. Each gNB estimates the uplink channel based on the EH-RS, and uses the uplink channel parameters as estimates of the downlink channel parameters.

Figure 20:
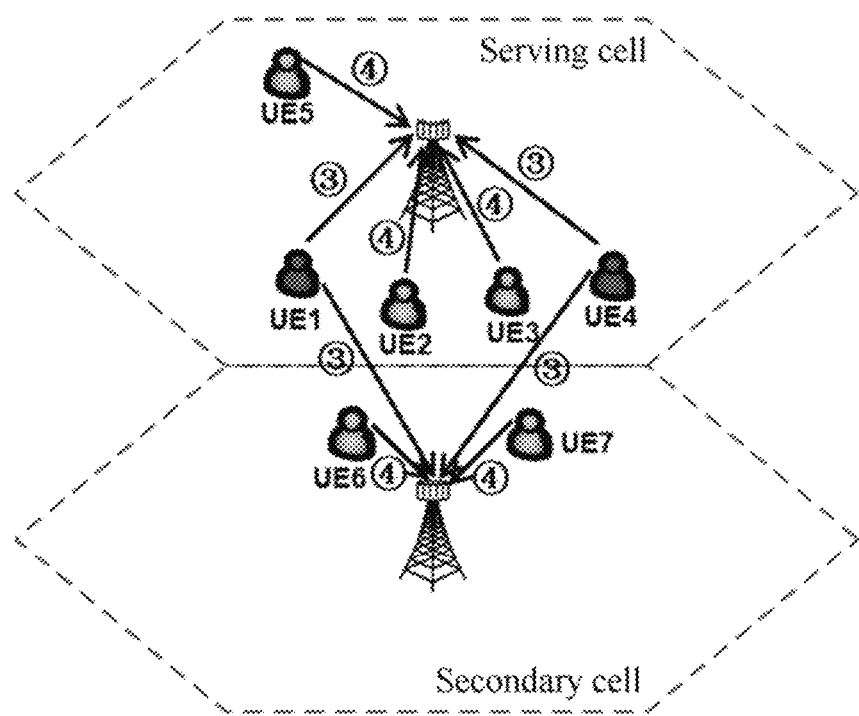
FIG. 20 is a schematic diagram for explaining an example situation in which user equipment transmits a pilot.

As shown in the example scenario of FIG. 20, EH users (UE1 and UE4) transmit EH-RS (3) to the EH primary serving gNB and each secondary gNB. At the same time, DT users (UE2, UE3, UE5, UE6 and UE7) transmit data pilots (4) to their respective DT primary serving gNBs.

According to the uplink pilot signal, the gNB can obtain uplink channel link parameters. In a time division duplex system, the uplink and downlink perform transmission on different time slots of the same frequency resource. In the coherent time of the channel, it can be deemed that the channel fading experienced by the uplink and downlink transmission signals is basically the same. Therefore, the gNB can use uplink channel parameters as estimates of downlink channel parameters.

In addition, according to an aspect of the present invention, the UE may harvest energy from beams jointly transmitted by multiple base stations. Next, an embodiment of this aspect will be described with reference to FIG. 1 as well.

As shown in FIG. 1, the electronic device 100 for wireless communication according to an embodiment includes a processing circuitry 110. The processing circuitry 110 includes a first control unit 111 and a second control unit 113.

The first control unit 111 is similar to the previously explained configuration. The second control unit 113 is configured to perform control to harvest energy from beams jointly transmitted by multiple base stations.

For data transmission, each base station independently designs the data beam and avoids interference to users in adjacent cells. In order to obtain a high beamforming gain, data transmission can adopt a hybrid beamforming method to make full use of the analog and digital beamforming gains. Regarding beamforming, each base station independently performs data transmission beamforming for users in the coverage area to avoid interference to other users. However, in the energy harvesting process, all signals can be used to harvest energy, and there is no interference problem. Therefore, the data beamforming method is inefficient in the EH network.

By harvesting energy from beams jointly transmitted by multiple base stations, the efficiency of energy harvesting can be improved.

Specifically, based on the obtained downlink channel, the gNB implements beamforming for data and energy transmission. For DT users, the gNB can use the same data beamforming method as the existing network. For EH users, all gNBs in the cooperative set can jointly perform energy beamforming.

Assume that L gNBs each configured with M antennas jointly transmit data to multiple single-antenna DT users and transmit energy to multiple single-antenna EH users. The number of EH users in cell l is denoted as Ki, the obtained channel parameters are denoted as $h_{j,(l,k)}$, which represents the uplink channel from EH user k in cell l to cell j, and then the energy precoding vector of $gNB_j$ can be expressed as:

$$w_j = \sum_{l=1}^{L} \sum_{k=1}^{K_l} \alpha_{lk} h^*_{j,(l,k)},$$

It can be seen that $w_j$ is not only related to the channel parameters of EH users in the present cell, but also related to the channel parameters of EH users in neighbor cells.

Furthermore, the energy precoding matrix common to L gNBs is expressed as:

$$w_E = [w_1^T, w_2^T, \ldots, w_L^T]^T,$$

Where $\{\alpha_{lk}\}$ is combination coefficients that make $\|w_E\|=1$.

The EH user only harvests the energy in the received signal without demodulating the signal, so the same transmission symbol $S_E$ can be used for different EH users. Then, the signal transmitted by gNB j to the EH user is:

$$X_j = w_j S_E$$

After receiving signals from multiple gNBs, the EH user converts the signals into electrical energy through an energy conversion module and stores it in the battery. The signals transmitted by each gNB to the user are superimposed at the user, and the energy is superimposed, which improves the efficiency of energy harvesting.

Next, an example process of energy harvesting will be explained with reference to FIG. 11. This process involves multiple aspects in the above embodiment: first, the user reports basic information, and the user equipment or the DT primary serving gNB triggers the energy harvesting process: with the help of the DT primary serving gNB, the EH primary serving gNB and the secondary gNB are determined and they form a cooperative set: the primary serving gNB selects a suitable frame structure from the newly defined hybrid frame structures according to the frame structure adopted by the secondary gNB and according to certain criteria, and transmits the corresponding SFI to the user and the secondary gNB; according to the selected SFI, each gNB in the cooperative set allocates network resources to users within its coverage: an energy harvesting dedicated pilot EH-RS is designed for the EH network, and all EH users multiplex the EH-RS to transmit it to the base station; the base stations estimate the channels according to the EH-RS and jointly transmits energy for users.

Figure 11:
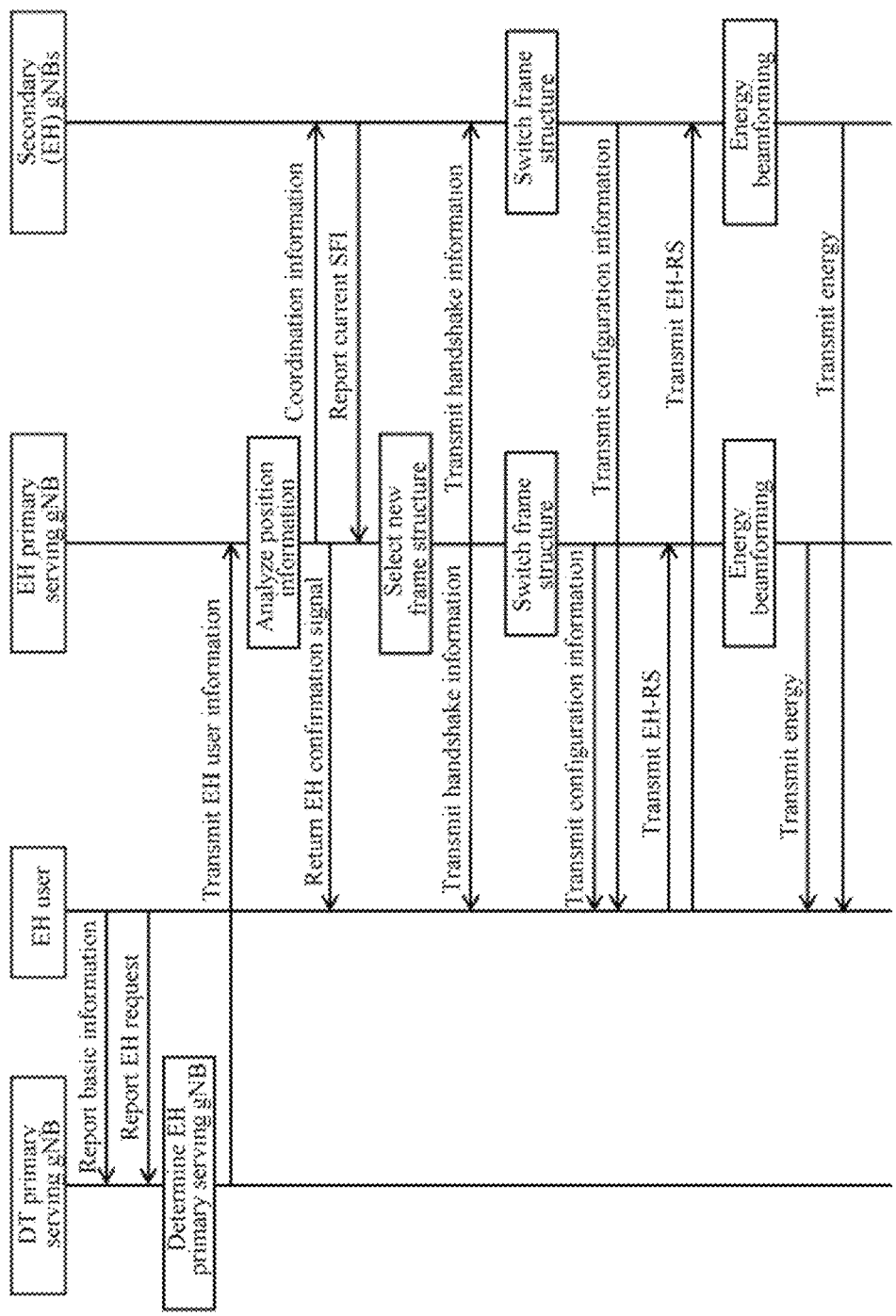
FIG. 11 is a flowchart showing a process example for explaining energy harvesting.

Specifically, as shown in FIG. 11, first, all user equipments, for example, detect their own remaining powers, and report basic information to the DT primary serving gNB in the DT mode, including the energy status of the terminal, the priority of the EH user, the neighbor cell ID, the device type and the battery type, etc. According to this information, the user equipment or the DT primary serving gNB triggers the EH process.

If the DT primary serving gNB is the base station closest to the EH user, there is no need to switch the primary serving base station: otherwise, the primary serving base station switching process is performed. The DT primary serving gNB can help the user identify the EH primary serving gNB. The EH primary serving gNB can identify the secondary gNB according to the neighbor cell ID reported by the user. The secondary gNB can form a cooperative set with the primary serving gNB.

Next, the hybrid frame structure is defined for the EH network. The criteria followed in the design of the hybrid frame structure may include: they cannot occupy resources of data transmission, cannot affect data transmission, and cannot interfere with uplink and downlink switching.

Then, according to the frame structure currently adopted by the secondary gNB, the EH primary serving gNB re-selects a suitable frame structure for the cooperative set, and configures the network under the selected frame structure.

Next, each gNB in the cooperative set switches to the newly selected frame structure, and allocates network resources to users within their respective coverage areas.

In addition, the energy harvesting dedicated pilot signal EH-RS can be designed for the EH network, and all EH users can share the pilot signal on the uplink.

Using the designed EH-RS pattern, the EH user transmits EH-RS to the primary serving gNB and the secondary gNB. Each gNB estimates the uplink channel based on the EH-RS, and uses the uplink channel parameters as the estimates of the downlink channel parameters.

For the DT user, each gNB uses the same data beamforming method as the existing network. For the EH user, all gNBs in the cooperative set jointly implement energy beamforming.

It should be pointed out that the embodiments of the present invention need not include all of the above aspects.

In the foregoing description of the electronic device for wireless communication according to the embodiments of the present invention, some procedures and methods are obviously also disclosed. Next, without repeating the details that have been fully described, a description is given of the wireless communication method according to the embodiment of the present invention.

Figure 3:
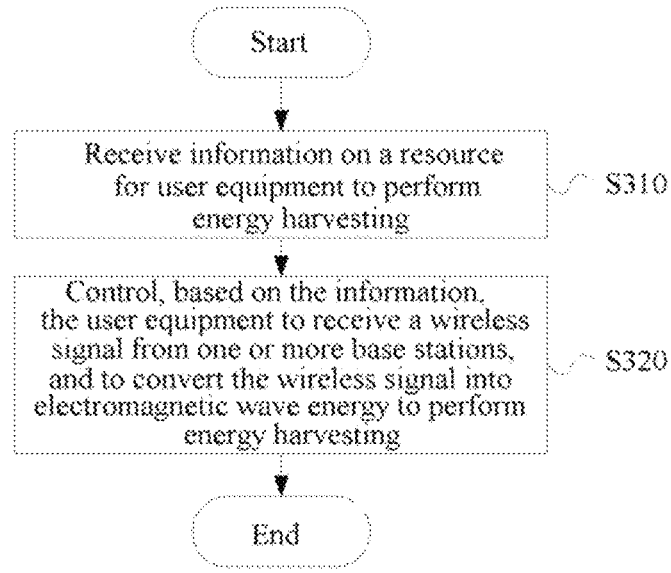
FIG. 3 is a flowchart showing a process example of a wireless communication method according to an embodiment of the present disclosure.

As shown in FIG. 3, the wireless communication method according to an embodiment includes a step S310 of receiving information on resources for user equipment to perform energy harvesting. The method also includes a step S320 of controlling, based on the information, the user equipment to receive a wireless signal from one or more base stations, and to convert the wireless signal into electromagnetic wave energy to perform energy harvesting.

The foregoing describes the embodiments of the device and method corresponding to the user equipment side. In addition, the present invention also provides embodiments implemented on the base station side. Next, without repeating the details corresponding to the previously described embodiments, a description is given of embodiments corresponding to the device and method on the base station side.

Figure 4:
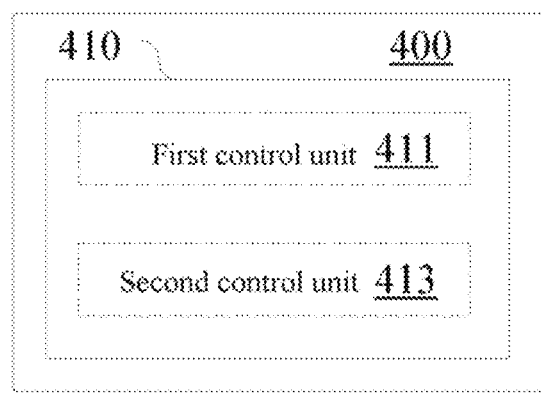
FIG. 4 is a block diagram showing a configuration example of an electronic device for wireless communication according to an embodiment of the present disclosure.

As shown in FIG. 4, the electronic device 400 for wireless communication according to an embodiment includes a processing circuitry 410. The processing circuitry 410 includes a first control unit 411 and a second control unit 413.

The first control unit 411 is configured to perform control to transmit, by a first base station, information on a resource for user equipment to perform energy harvesting to the user equipment or a second base station.

The second control unit 413 is configured to perform control to transmit a wireless signal for energy harvesting to the user equipment.

According to an embodiment, the transmitted information includes indication information on a frame structure of the wireless signal.

Figure 5:
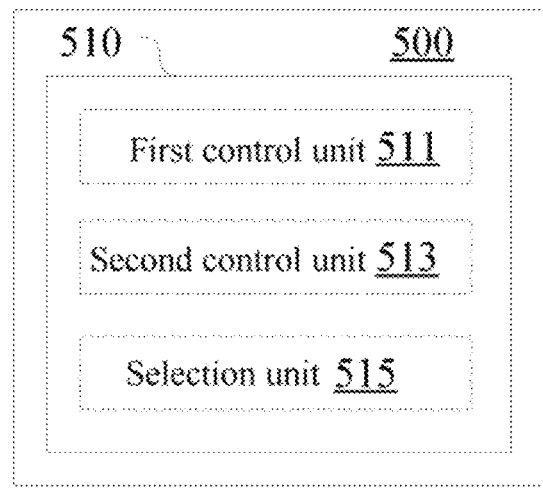
FIG. 5 is a block diagram showing a configuration example of an electronic device for wireless communication according to another embodiment of the present disclosure.

As shown in FIG. 5, the electronic device 500 for wireless communication according to an embodiment includes a processing circuitry 510. In addition to the first control unit 511 and the second control unit 513 similar to the first control unit 411 and the second control unit 413, the processing circuitry 510 further includes a selection unit 515.

The selection unit 515 is configured to select a frame structure to be used for the user equipment from a plurality of frame structures.

According to an embodiment, a plurality of predefined frame structures may include the frame structure(s) used by one or more second base stations that are to cooperate with the first base station to transmit energy to the user equipment, and the first control unit 511 may also be configured to perform control to transmit an indication on the determined frame structure to the one or more second base stations.

Figure 6:
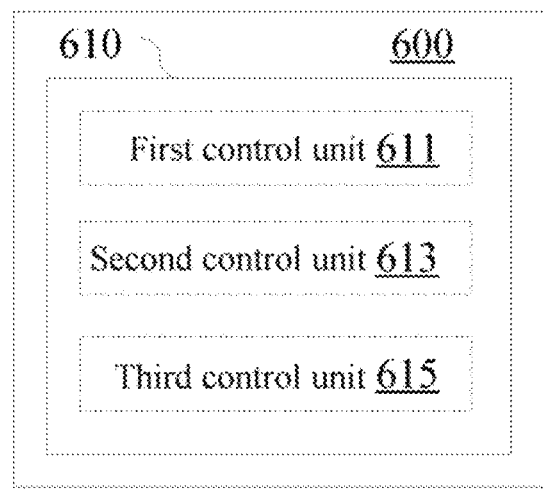
FIG. 6 is a block diagram showing a configuration example of an electronic device for wireless communication according to another embodiment of the present disclosure.

As shown in FIG. 6, the electronic device 600 for wireless communication according to an embodiment includes a processing circuitry 610. In addition to the first control unit 611 and the second control unit 613 which are similar to the first control unit 411 and the second control unit 413, the processing circuitry 610 further includes a third control unit 615.

The third control unit 615 may be configured to perform control to receive a request for switching to the energy harvesting mode from the user equipment. Alternatively, the third control unit 615 may be configured to perform control to receive one or more of the energy status, the priority of energy harvesting, the neighbor cell identification, the user equipment type, and the battery type of the user equipment.

In addition, the first control unit 611 may be configured to perform control to transmit an instruction to switch to the energy harvesting mode to the user equipment.

Still referring to FIG. 6, an electronic device for wireless communication according to another embodiment is explained.

According to an embodiment, the third control unit 615 may be configured to determine a set of base stations to transmit energy to the user equipment according to the position (location) of the user equipment, and the first control unit 611 may be configured to perform control to transmit identification of the base stations in the determined set to the user equipment.

Still referring to FIG. 6, an electronic device for wireless communication according to another embodiment is explained.

According to an embodiment, the third control unit 615 is configured to perform control to receive a pilot for energy harvesting from the user equipment.

Still referring to FIG. 4, an electronic device for wireless communication according to another embodiment is explained.

According to an embodiment, the second control unit 413 is configured to perform control so that the first base station and one or more other base stations jointly transmit beams for energy harvesting to the user equipment.

The foregoing embodiments corresponding to the base station side may be implemented, for example, on the side of the primary base station that performs energy transmission for the user equipment. In addition, the embodiments of the present invention may also be implemented on the side of the secondary base station that performs energy transmission for the user equipment.

Still referring to FIG. 6, the electronic device 600 for wireless communication according to an embodiment includes a processing circuitry 610. In addition to the first control unit 611 and the second control unit 613 which are similar to the first control unit 411 and the second control unit 413, the processing circuitry 610 further includes a third control unit 615.

The third control unit 615 is configured to perform control to receive, by the first base station, indication information on the frame structure from the second base station, and control the first base station to switch to the indicated frame structure.

Figure 7:
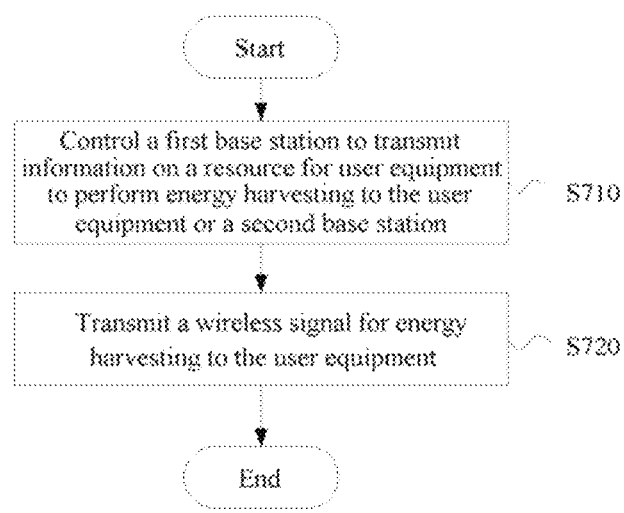
FIG. 7 is a flowchart showing a process example of a wireless communication method according to an embodiment of the present disclosure.

As shown in FIG. 7, the wireless communication method according to an embodiment includes a step S710 of controlling a first base station to transmit information on a resource for user equipment to perform energy harvesting to the user equipment or a second base station, and a step S720 of transmitting a wireless signal for energy harvesting to the user equipment.

In addition, the embodiments of the present disclosure also include a computer-readable medium, which includes executable instructions that, when executed by an information processing device, causes the information processing device to execute the foregoing method.

As an example, steps of the above methods and modules and/or units of the above devices may be implemented as software, firmware, hardware or a combination thereof. In a case of implementing by software or firmware, programs constituting the software for implementing the above methods may be installed to a computer with a dedicated hardware structure (for example, a general-purpose computer 1400 shown in FIG. 7) from a storage medium or a network. The computer is capable of performing various functions when installed with various programs.

Figure 8:
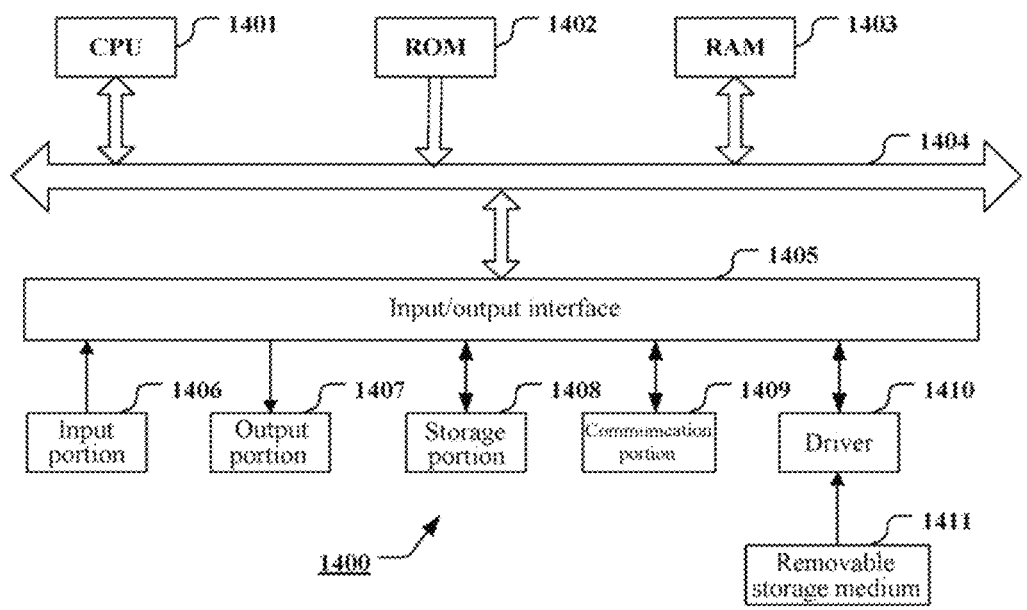
FIG. 8 is a block diagram showing an exemplary structure of a computer for implementing the method and the device according to the present disclosure.

In FIG. 8, a central processing unit (CPU) 1401 performs various processing based on programs stored in a read only memory (ROM) 1402 or programs loaded from a storage portion 1408 to a random access memory (RAM) 1403. Data required when the CPU 1401 performs various processing is also stored in the RAM 1403 as needed. The CPU 1401, the ROM 1402, and the RAM 1403 are linked to each other via a bus 1404. An input/output interface 1405 is also linked to the bus 1404.

The input/output interface 1405 is linked with an input portion 1406 (including a keyboard, a mouse and the like), an output portion 1407 (including a display, such as a Cathode Ray Tube (CRT) and a Liquid Crystal Display (LCD), and a loudspeaker), a storage portion 1408 (including a hard disk and the like), and a communication portion 1409 (including a network interface card, such as a LAN card, a modem and the like). The communication portion 1409 performs communication processing via a network such as the Internet. A driver 1410 may also be linked to the input/output interface 1405 as needed. A removable medium 1411 such as a magnetic disk, an optical disk, a magneto-optical disk, and a semiconductor memory is mounted on the driver 1410 as needed, so that a computer program read from the removable medium is installed into the storage portion 1408 as needed.

In a case where the above series of processing are implemented by software, programs forming the software are installed from a network such as the Internet or a storage medium such as the removable medium 1411.

Those skilled in the art should understand that the storage medium is not limited to the removable medium 1411 shown in FIG. 8 that stores a program and is distributed separately from a device so as to provide the program to the user. Examples of the removable medium 1411 include: a magnetic disk (including a floppy disk (registered trademark)), an optical disk (including a compact disk read only memory (CD-ROM) and a digital versatile disk (DVD)), a magnetic-optical disk (including a mini disk (MD) (registered trademark)), and a semiconductor memory. Alternatively, the storage medium may be the ROM 1402, a hard disk included in the storage portion 1408 or the like. The storage medium has a program stored therein and is distributed to the user together with a device in which the storage medium is included.

A program product storing machine readable instruction codes is further provided according to an embodiment of the present disclosure. The instruction codes, when being read and executed by a machine, may perform the methods according to the above embodiments of the present disclosure.

Accordingly, a storage medium for carrying the program product storing the machine-readable instruction codes is also provided according to the present disclosure. The storage medium may include, but not limited to, a floppy disk, an optical disk, a magneto-optical disk, a memory card, a memory stick and the like.

The following electronic device is further involved in the embodiments of the present disclosure. In a case where the electronic device is used for a base station side, the electronic device may be implemented as any type of gNB or evolved node B (eNB), such as a macro eNB and a small eNB. The small eNB may be an eNB covering a cell smaller than a macro cell, such as a pico eNB, a micro eNB and a home (femto) eNB. Alternatively, the electronic device may be implemented as any other type of base station, such as a NodeB and a base transceiver station (BTS). The electronic device may include: a body configured to control wireless communications (which is also referred to as a base station equipment): and one or more remote radio heads (RRH) located at a different position from the body. In addition, various types of terminals, which are described below; may each serve as a base station by performing functions of the base station temporarily or semi-persistently.

In a case where the electronic device is used for a user equipment side, the electronic device may be implemented as a mobile terminal (such as a smartphone, a tablet personal computer (PC), a notebook PC, a portable game terminal, a portable/dongle mobile router and a digital camera) or a vehicle terminal (such as an a vehicle navigation device). Furthermore, the electronic device may be a wireless communication module (such as an integrated circuitry module including a single or multiple dies) mounted on each of the terminals described above.

[Application Example for a Terminal Equipment]

Figure 9:
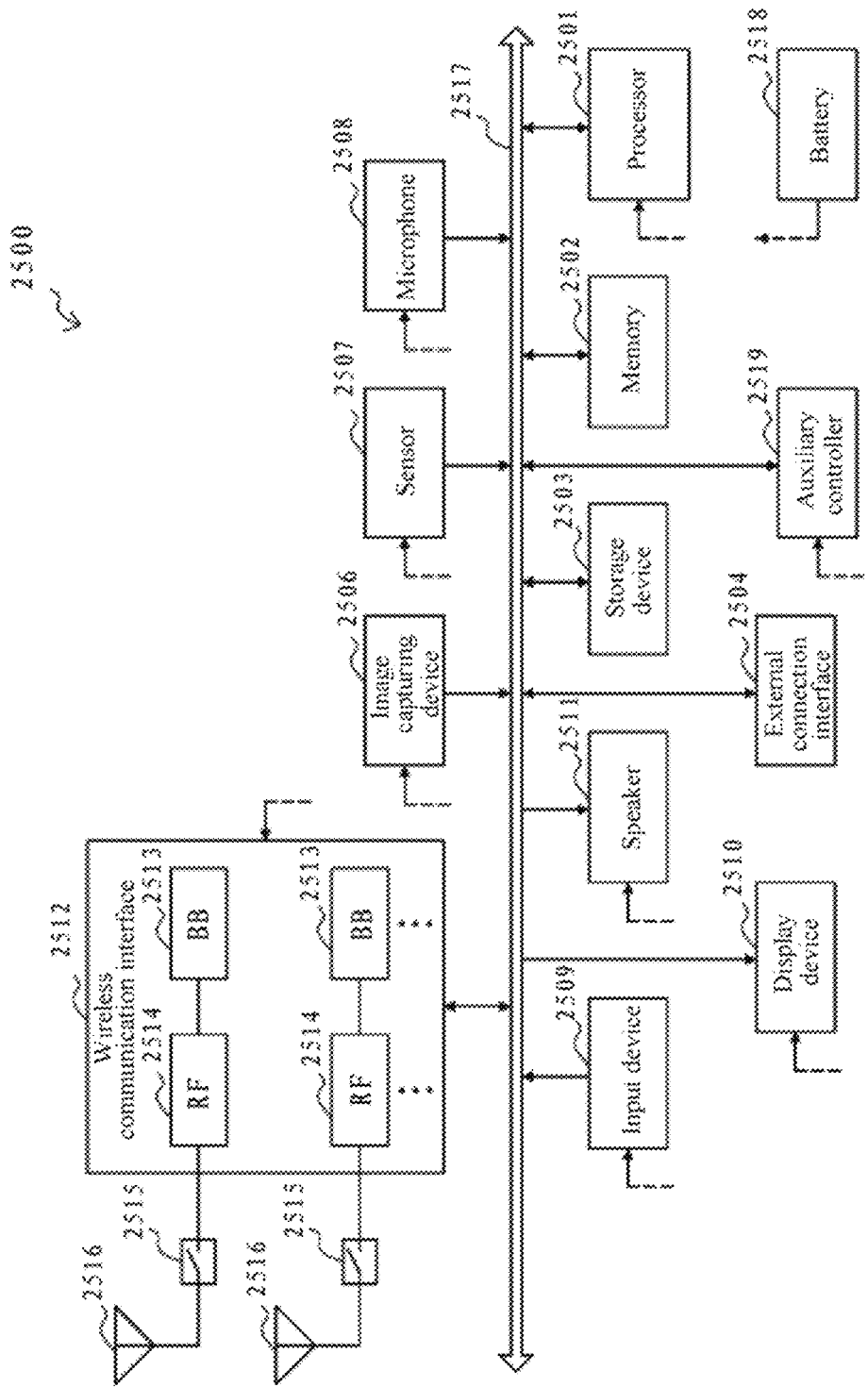
FIG. 9 is a block diagram showing a schematic configuration of a smart phone to which the technology according to the present disclosure may be applied.

FIG. 9 is a block diagram showing an exemplary configuration of a smartphone 2500 to which the technology according to the present disclosure may be applied. The smartphone 2500 includes a processor 2501, a memory 2502, a storage device 2503, an external connection interface 2504, an image capturing device 2506, a sensor 2507, a microphone 2508, an input device 2509, a display device 2510, a speaker 2511, a wireless communication interface 2512, one or more antenna switches 2515, one or more antennas 2516, a bus 2517, a battery 2518 and an auxiliary controller 2519.

The processor 2501 may be, for example, a CPU or a system on chip (SoC), and control functions of an application layer and additional layer of the smartphone 2500. The memory 2502 includes an RAM and an ROM, and stores a program that is executed by the processor 2501 and data. The storage 2503 may include a storage medium such as a semiconductor memory and a hard disk. The external connection interface 2504 is an interface for connecting an external device (such as a memory card and a Universal Serial Bus (USB) device) to the smartphone 2500.

The image capturing device 2506 includes an image sensor (such as a charge coupled device (CCD) and a complementary metal oxide semiconductor (CMOS)), and generates a captured image. The sensor 2507 may include a group of sensors, such as a measurement sensor, a gyro sensor, a geomagnetic sensor and an acceleration sensor. The microphone 2508 converts sound inputted to the smartphone 2500 into an audio signal. The input device 2509 includes, for example, a touch sensor configured to detect touch onto a screen of the display device 2510, a keypad, a keyboard, a button, or a switch, and receives an operation or information inputted by a user. The display device 2510 includes a screen such as a liquid crystal display (LCD) and an organic light-emitting diode (OLED) display, and displays an output image of the smartphone 2500. The speaker 2511 is configured to convert an audio signal outputted from the smartphone 2500 into sound.

The wireless communication interface 2512 supports any cellular communication scheme such as LTE and LTE-Advanced, and performs wireless communication. The wireless communication interface 2512 may generally include, for example, a baseband (BB) processor 2513 and a radio frequency (RF) circuit 2514. The BB processor 2513 may perform, for example, encoding/decoding, modulation/demodulation, and multiplexing/demultiplexing, and perform various types of signal processing for wireless communication. The RF circuit 2514 may include, for example, a mixer, a filter and an amplifier, and transmits and receives a wireless signal via the antenna 2516. The wireless communication interface 2512 may be a chip module having a BB processor 2513 and an RF circuit 2514 integrated thereon. The wireless communication interface 2512 may include multiple BB processors 2513 and multiple RF circuits 2514, as shown in FIG. 9. Although an example in which the wireless communication interface 2512 includes multiple BB processors 2513 and multiple RF circuits 2514 is shown in FIG. 9, the wireless communication interface 2512 may include a single BB processor 2513 and a single RF circuit 2514.

Furthermore, in addition to a cellular communication scheme, the wireless communication interface 2512 may support another type of wireless communication scheme such as a short-range wireless communication scheme, a near field communication scheme, and a wireless local area network LAN scheme. In this case, the wireless communication interface 2512 may include a BB processor 2513 and an RF circuit 2514 for each wireless communication scheme.

Each of the antenna switches 2515 switches connection destinations of the antennas 2516 among multiple circuits (such as circuits for different wireless communication schemes) included in the wireless communication interface 2512.

Each of the antennas 2516 includes a single or multiple antenna elements (such as multiple antenna elements included in an MIMO antenna), and is used for the wireless communication interface 2512 to transmit and receive a wireless signal. As shown in FIG. 9, the smartphone 2500 may include multiple antennas 2516. Although FIG. 9 shows an example in which the smartphone 2500 includes multiple antennas 2516, the smartphone 2500 may include a single antenna 2516.

In addition, the smartphone 2500 may include an antenna 2516 for each wireless communication scheme. In this case, the antenna switch 2515 may be omitted from the configuration of the smartphone 2500.

The processor 2501, the memory 2502, the storage device 2503, the external connection interface 2504, the image capturing device 2506, the sensor 2507, the microphone 2508, the input device 2509, the display device 2510, the speaker 2511, the wireless communication interface 2512, and the auxiliary controller 2519 are connected to each other via the bus 2517. The battery 2518 supplies power to the respective blocks of the smartphone 2500 as shown in FIG. 9 via feeder lines which are partially shown as dashed lines in the figure. The auxiliary controller 2519 manipulates a minimum necessary function of the smartphone 2500 in a sleep mode, for example.

In the smartphone 2500 shown in FIG. 9, the transceiver device of the wireless communication device at the user equipment side according to the embodiment of the present disclosure may be implemented by the wireless communication interface 2512. At least a part of the functions of the processing circuitry and/or respective units of the electronic device or the wireless communication device at the user equipment side according to the embodiment of the present disclosure may also be implemented by the processor 2501 or the auxiliary controller 2519. For example, a part of the function of the processor 2501 may be implemented by the auxiliary controller 2519 so as to reduce power consumption of the battery 2518. Further, the processor 2501 or the auxiliary controller 2519 may perform at least a part of the functions of the processing circuitry and/or respective units of the electronic device or wireless communication device at user equipment side according to the embodiment of the present disclosure by executing the program stored in the memory 2502 or the storage device 2503.

[Exemplary Application Regarding a Base Station]

Figure 10:
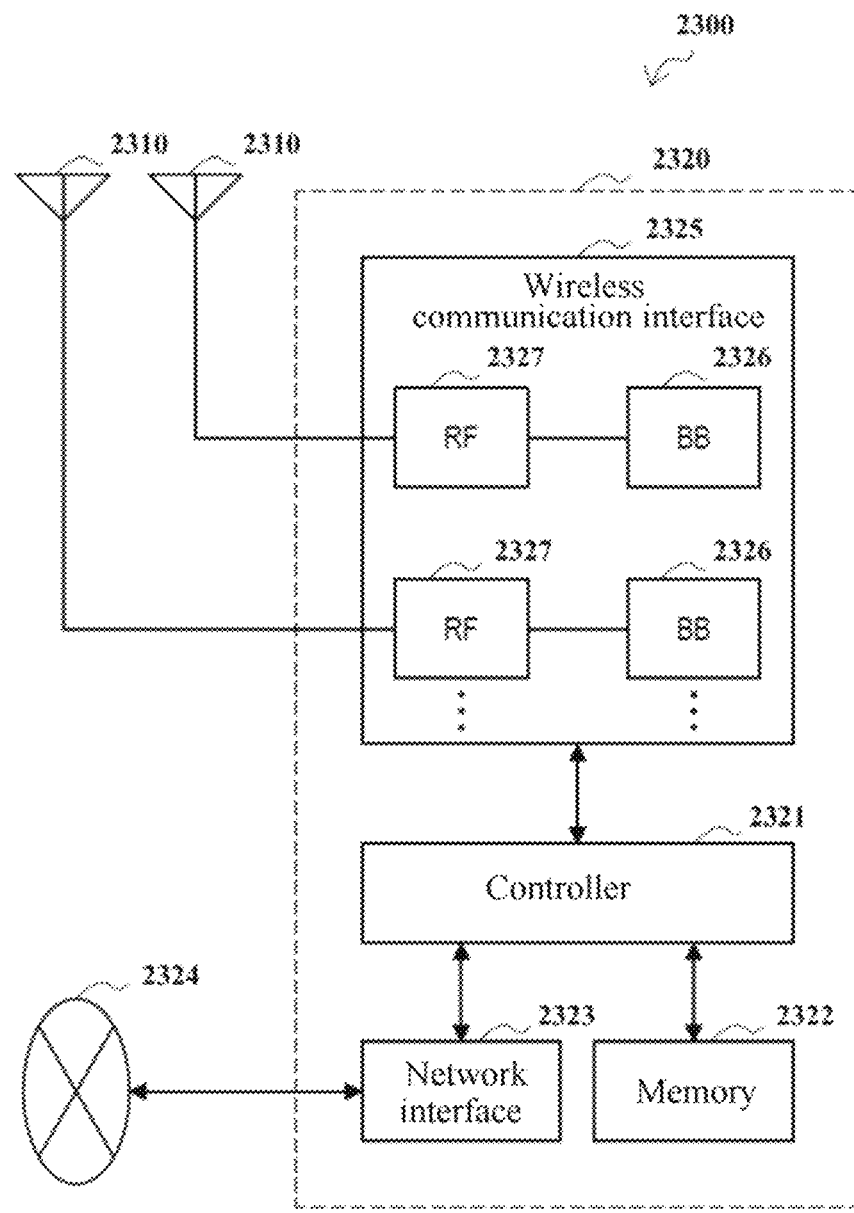
FIG. 10 is a block diagram showing an example of a schematic configuration of a gNB to which the technology according to the present disclosure may be applied.

FIG. 10 is a block diagram showing an exemplary configuration of a gNB to which the technology according to the present disclosure may be applied. A gNB 2300 includes one or more antennas 2310 and a base station equipment 2320. The base station equipment 2320 and each of the antenna 2310 may be connected with each other via a radio frequency (RF) cable.

Each of the antennas 2310 includes a single or multiple antenna elements (such as multiple antenna elements included in a Multi-Input Multi-Output (MIMO) antenna), and is configured for the base station equipment 2320 to transmit and receive a wireless signal. As shown in FIG. 10, the gNB 2300 may include multiple antennas 2310. For example, the multiple antennas 2310 may be compatible with multiple frequency bands used by the gNB 2300. Although FIG. 10 shows an example in which the gNB 2300 includes multiple antennas 2310, the gNB 2300 may include a single antenna 2310.

The base station equipment 2320 includes a controller 2321, a memory 2322, a network interface 2323, and a wireless communication interface 2325.

The controller 2321 may be, for example, a CPU or a DSP, and operate various functions of a higher layer of the base station equipment 2320. For example, the controller 2321 generates a data packet based on data in a signal processed by the wireless communication interface 2325, and transmits the generated packet via the network interface 2323. The controller 2321 may bundle data from multiple baseband processors to generate a bundled packet and transmit the generated bundled packet. The controller 2321 may have a logical function of performing control such as radio resource control, radio bearer control, mobility management, admission control, and scheduling. The control may be performed in corporation with a nearby gNB or core network node. The memory 2322 includes an RAM and an ROM, and stores a program executed by the controller 2321 and various types of control data (such as a terminal list, transmission power data and scheduling data).

The network interface 2323 is a communication interface for connecting the base station equipment 2320 to a core network 2324. The controller 2321 may communicate with the core network node or another gNB via the network interface 2323. In this case, the gNB 2300 may be connected with the core network node or another gNB via a logic interface (such as an S1 interface and an X2 interface). The network interface 2323 may also be a wired communication interface or a wireless communication interface for a wireless backhaul. In a case where the network interface 2323 is a wireless communication interface, the network interface 2323 may use a higher frequency band for wireless communication than a frequency band used by the wireless communication interface 2325.

The wireless communication interface 2325 supports any cellular communication scheme (such as Long Term Evolution (LTE) and LTE-Advanced), and provides wireless connection to a terminal located in a cell of the gNB 2300 via the antenna 2310. The wireless communication interface 2325 may generally include a BB processor 2326 and an RF circuit 2327. The BB processor 2326 may perform for example coding/decoding, modulation/demodulation and multiplexing/demultiplexing, and execute various types of signal processing of a layer (for example LI, Medium Access Control (MAC), Radio Link Control (RLC) and Packet Data Convergence Protocol (PDCP)). Instead of the controller 2321, the BB processor 2326 may have a part or all of the above-mentioned logic functions. The BB processor 2326 may be a memory storing communication control programs, or a module including a processor which is configured to execute the programs and a related circuit. Update of the programs may change the function of the BB processor 2326. The module may be a card or blade inserted into a slot of the base station equipment 2320. Alternatively, the module may be a chip mounted on a card or blade. The RF circuit 2327 may include, for example, a mixer, a filter and an amplifier, and transmits and receives a wireless signal via the antenna 2310.

As shown in FIG. 10, the wireless communication interface 2325 may include multiple BB processors 2326. For example, the multiple BB processors 2326 may be compatible with multiple frequency bands used by the gNB 2300. As shown in FIG. 10, the wireless communication interface 2325 may include multiple RF circuits 2327. For example, the multiple RF circuits 2327 may be compatible with multiple antenna elements. Although an example in which the wireless communication interface 2325 includes multiple BB processors 2326 and multiple RF circuits 2327 is shown in FIG. 10, the wireless communication interface 2325 may include a single BB processor 2326 and a single RF circuit 2327.

In the gNB 2300 shown in FIG. 10, the transceiver device of the wireless communication device at the base station side according to the embodiment of the present disclosure may be implemented by the wireless communication interface 2325. At least a part of the functions of the processing circuitry and/or respective units of the electronic device or the wireless communication device at the base station side according to the embodiment of the present disclosure may also be implemented by the controller 2321. For example, the controller 2321 may perform at least a part of the functions of the processing circuitry and/or respective units of the electronic device or the wireless communication device at base station side according to the embodiment of the present disclosure by executing the program stored in the memory 2322.

In the above description of specific embodiments of the present disclosure, features described and/or illustrated for one embodiment may be used in one or more other embodiments in the same or similar manner, or may be combined with features in other embodiments, or may replace features in other embodiments.

It is be noted that, terms "including/comprising" used herein refer to existing of features, elements, steps or components, but existing or adding of one or more other features, elements, steps or components is not excluded.

In the above embodiments and examples, reference numerals consist of numbers are used to represent steps and/or units. Those skilled in the art should understand that the reference numerals are used to facilitate describing and drawing, and are not intended to indicate an order or limitation in any way.

In addition, the method according to the present disclosure is not limited to be performed in the chronological order described herein, and may be performed in other chronological order, in parallel or independently. Therefore, the order in which the method is performed described herein does not limit the technical scope of the present disclosure.

Although the present disclosure is disclosed by the description of specific embodiments of the present disclosure above, it should be understood that all the embodiments and examples described above are only exemplary and are not intended to limit. Various modifications, improvements and equivalents may be made to the present disclosure by those skilled in the art within the scope and spirit of the attached claims. These modifications, improvements or equivalents shall also fall within the protection scope of the present disclosure.

In addition, the following solutions are further provided according to embodiments of present disclosure.

(1) An electronic device for wireless communication, comprising processing circuitry configured to:
perform control to receive information on a resource for user equipment to perform energy harvesting: and
control, based on the information, the user equipment to receive a wireless signal from one or more base stations, and to convert the wireless signal into electromagnetic wave energy to perform energy harvesting.

(2) The electronic device according to (1), wherein the information comprises indication information of a frame structure of the wireless signal, the indication information comprising a Slot Format Indication SFI.

(3) The electronic device according to (2), wherein the frame structure comprises a symbol for energy harvesting, and the processing circuitry is configured to control the user equipment to harvest energy on at least the symbol for energy harvesting.

(4) The electronic device according to (2), wherein the frame structure comprises a downlink symbol for data transmission, and the processing circuitry is configured to control the user equipment to receive data or harvest energy on the downlink symbol for data transmission.

(5) The electronic device according to (2), wherein the frame structure is selected from among a plurality of frame structures, each of the plurality of frame structures being defined based on one or more of the following rules:
a symbol for energy harvesting does not occupy a resource for data transmission;
a downlink symbol immediately preceding a symbol for energy harvesting is not used for downlink data transmission: and
a symbol immediately preceding an uplink symbol or a part thereof is not used for energy harvesting.

(6) The electronic device according to (5), wherein the frame structure is selected by a first base station, and the plurality of frame structures that are pre-defined include frame structures used by one or more other base stations that are to cooperate with the first base station to transmit energy to the user equipment.

(7) The electronic device according to (1), wherein the processor is further configured to perform an operation for triggering of the energy harvesting, the operation comprising:
making a request, when it is detected that a remaining power of the user equipment is lower than a predetermined threshold, to a first base station for switching to an energy harvesting mode.

(8) The electronic device according to (7), wherein the operation comprises:
receiving an instruction from the first base station to switch the user equipment to the energy harvesting mode.

(9) The electronic device according to (8), wherein the operation further comprises reporting one or more of the following information of the user equipment to the first base station:
an energy status;
a priority of energy harvesting;
neighbor cell identification; and
a user equipment type and a battery type.

(10) The electronic device according to any one of (1)-(9), wherein the one or more base stations are determined according to a position of the user equipment.

(11) The electronic device according to (7), wherein the operation comprises:
receiving identification of a primary serving base station in the energy harvesting mode from a primary serving base station in a data transmission mode, and requesting access to the primary serving base station in the energy harvesting mode.

(12) The electronic device according to any one of (1)-(9), wherein the processing circuitry is further configured to perform control to transmit a pilot for energy harvesting.

(13) The electronic device according to (12), wherein the pilot occupies resources spaced apart in both a time domain and a frequency domain, and the pilot does not occupy a time-frequency resource of a demodulation reference signal or a sounding reference signal.

(14) The electronic device according to any one of (1)-(9), wherein the processing circuitry is configured to perform control to harvest energy from beams jointly transmitted by a plurality of base stations.

(15) A wireless communication method, comprising:
receiving information on a resource for user equipment to perform energy harvesting; and
controlling, based on the information, the user equipment to receive a wireless signal from one or more base stations, and to convert the wireless signal into electromagnetic wave energy to perform energy harvesting.

(16) An electronic device for wireless communication, comprising processing circuitry configured to:
perform control to transmit, by a first base station, information on a resource for user equipment to perform energy harvesting to the user equipment or a second base station: and
perform control to transmit a wireless signal for energy harvesting to the user equipment.

(17) The electronic device according to (16), wherein the information includes indication information on a frame structure of the wireless signal.

(18) The electronic device according to (17), wherein the processing circuitry is further configured to select a frame structure to be used for the user equipment from a plurality of frame structures.

(19) The electronic device according to (18), wherein the plurality of frame structures that are pre-defined includes frame structures used by one or more second base stations that are to cooperate with the first base station to transmit energy to the user equipment, and the processing circuitry is further configured to perform control to transmit an indication on a determined frame structure to the one or more second base stations.

(20) The electronic device according to any one of (16)-(19), wherein the processing circuitry is further configured to:

perform control to receive, from the user equipment, a request for switching to an energy harvesting mode, or one or more of an energy status, a priority of energy harvesting, neighbor cell identification, a user equipment type, and a battery type of the user equipment; and perform control to transmit an instruction to switch to the energy harvesting mode to the user equipment.

(21) The electronic device according to any one of (16)-(19), wherein the processing circuitry is further configured to:

determine a set of base stations to transmit energy to the user equipment according to a position of the user equipment: and perform control to transmit identification of the base stations in the determined set to the user equipment.

(22) The electronic device according to any one of (16)-(19), wherein the processing circuitry is further configured to perform control to receive a pilot for energy harvesting from the user equipment.

(23) The electronic device according to any one of (16)-(19), wherein the processing circuitry is further configured to perform control so that the first base station and one or more other base stations jointly transmit beams for energy harvesting to the user equipment.

(24) The electronic device according to (17), wherein the processing circuitry is further configured to:

perform control so that the first base station receives the indication information on the frame structure from the second base station; and control the first base station to switch to the indicated frame structure.

(25) A wireless communication method, comprising:

controlling a first base station to transmit information on a resource for user equipment to perform energy harvesting to the user equipment or a second base station; and transmitting a wireless signal for energy harvesting to the user equipment.

(26) A computer readable medium comprising executable instructions that, when executed by an information processing device, cause the information processing device to implement the method according to (15) or (25).

The invention claimed is:

1. An electronic device for wireless communication, comprising: processing circuitry configured to perform control to receive information on a resource for user equipment to perform energy harvesting; and control, based on the information, the user equipment to receive a wireless signal from one or more base stations, and to convert the wireless signal into electromagnetic wave energy to perform the energy harvesting, wherein the information includes indication information of a frame structure of the wireless signal, the indication information including a Slot Format Indication (SFI).

2. The electronic device according to claim 1, wherein the frame structure includes a symbol for energy harvesting, and the processing circuitry is further configured to control the user equipment to harvest energy on at least the symbol for energy harvesting.

3. The electronic device according to claim 1, wherein the frame structure includes a downlink symbol for data transmission, and the processing circuitry is further configured to control the user equipment to receive data or harvest energy on the downlink symbol for data transmission.

4. The electronic device according to claim 1, wherein the frame structure is selected from among a plurality of frame structures, each of the plurality of frame structures being defined based on one or more of the following rules a symbol for energy harvesting does not occupy a resource for data transmission;

a downlink symbol immediately preceding a symbol for energy harvesting is not used for downlink data transmission; and a symbol immediately preceding an uplink symbol or a part thereof is not used for energy harvesting.

5. The electronic device according to claim 4, wherein the frame structure is selected by a first base station, and the plurality of frame structures that are defined includes frame structures used by one or more other base stations that are to cooperate with the first base station to transmit energy to the user equipment.

6. The electronic device according to claim 1, wherein the processing circuitry is further configured to perform an operation for triggering of the energy harvesting, the operation including making a request, when the user equipment detects that a remaining power of the user equipment is lower than a predetermined threshold, to a first base station for switching to an energy harvesting mode.

7. The electronic device according to claim 6, wherein the operation further includes receiving an instruction from the first base station to switch the user equipment to the energy harvesting mode.

8. The electronic device according to claim 7, wherein the operation further includes reporting one or more of the following information of the user equipment to the first base station an energy status;

a priority of energy harvesting;

neighbor cell identification; and a user equipment type and a battery type.

9. The electronic device according to claim 1, wherein the processing circuitry is further configured to determine the one or more base stations according to a position of the user equipment.

10. An electronic device for wireless communication, comprising:

processing circuitry configured to perform control to receive information on a resource for user equipment to perform energy harvesting; and control, based on the information, the user equipment to receive a wireless signal from one or more base stations, and to convert the wireless signal into electromagnetic wave energy to perform the energy harvesting, wherein the processing circuitry is further configured to perform an operation for triggering of the energy harvesting and the operation includes making a request, when the user equipment detects that a remaining power of the user equipment is lower than a predetermined threshold, to a first base station for switching to an energy harvesting mode, receiving identification of a primary serving base station in the energy harvesting mode from a primary serving base station in a data transmission mode, and requesting access to the primary serving base station in the energy harvesting mode.

11. The electronic device according to claim 1, wherein the processing circuitry is further configured to perform control to transmit a pilot for energy harvesting.

12. The electronic device according to claim 11, wherein the pilot occupies resources spaced apart in both a time domain and a frequency domain, and the pilot does not occupy a time-frequency resource of a demodulation reference signal or a sounding reference signal.

13. The electronic device according to claim 1, wherein the processing circuitry is further configured to perform control to harvest energy from beams jointly transmitted by a plurality of base stations.

14. An electronic device for wireless communication, comprising:

processing circuitry configured to perform control to transmit, by a first base station, information on a resource for user equipment to perform energy harvesting to the user equipment or one or more second base stations; and perform control to transmit a wireless signal for energy harvesting to the user equipment, wherein the information includes indication information on a frame structure of the wireless signal, the processing circuitry is further configured to select a frame structure to be used for the user equipment from among a plurality of frame structures, the plurality of frame structures includes frame structures used by the one or more second base stations that are to cooperate with the first base station to transmit energy to the user equipment, and the processing circuitry is further configured to perform control to transmit an indication on a determined frame structure to the one or more second base stations.

15. The electronic device according to claim 14, wherein the processing circuitry is further configured to perform control to receive, from the user equipment, a request for switching to an energy harvesting mode, or one or more of an energy status, a priority of energy harvesting, neighbor cell identification, a user equipment type, and a battery type of the user equipment, perform control to transmit, to the user equipment, an instruction to switch to the energy harvesting mode;

determine a set of base stations to transmit energy to the user equipment according to a position of the user equipment;

perform control to transmit, to the user equipment, identification of the base stations in the determined set; and perform control to receive a pilot for energy harvesting from the user equipment; or perform control so that the first base station and the one or more second base stations jointly transmit beams for energy harvesting to the user equipment.

* * * * *